United States Patent [19]
Rudolph et al.

[11] Patent Number: 5,685,407
[45] Date of Patent: Nov. 11, 1997

[54] TRANSMISSION DEVICE FOR A MOTOR VEHICLE

[75] Inventors: Gerda Rudolph, Sao-Bernardo do Campo-SP, Brazil; Michael Grosse-Erdmann, Rochester Hills, Mich.; Joseph L. Bair, Royal Oak, Mich.; Edwin Murray, Macomb, Mich.; Peter Doll, Troy, Mich.; Heiko Schulz-Andres, Poppenhausen, Germany

[73] Assignee: Fichtel & Sachs AG, Schweinfurt, Germany

[21] Appl. No.: 396,143

[22] Filed: Feb. 27, 1995

[30]  Foreign Application Priority Data

Feb. 26, 1994 [DE] Germany .................. 44 06 291.5

[51] Int. Cl.⁶ .................................................. F16D 13/60
[52] U.S. Cl. .................. 192/70.13; 464/92; 403/349; 403/350; 29/407.1; 29/525.11
[58] Field of Search ................. 192/70.13, 70.17; 403/348, 349, 350, 353; 464/92; 29/407.1, 525.11

[56]  References Cited

U.S. PATENT DOCUMENTS

| | | | |
|---|---|---|---|
| 4,212,560 | 7/1980 | Pufpaff et al. | 403/353 |
| 4,725,029 | 2/1988 | Herve | 403/348 X |
| 4,784,046 | 11/1988 | Gautier | 403/348 X |
| 4,790,235 | 12/1988 | Gautier et al. | 403/348 X |
| 4,817,775 | 4/1989 | Baccalaro et al. | 192/70.13 X |
| 5,191,810 | 3/1993 | Craft et al. | |
| 5,215,332 | 6/1993 | De Sloovere | 403/353 X |
| 5,310,276 | 5/1994 | Bergers et al. | 403/348 |
| 5,476,166 | 12/1995 | Schierling et al. | 192/70.17 |

FOREIGN PATENT DOCUMENTS

| | | |
|---|---|---|
| 0385752 | 9/1990 | European Pat. Off. . |
| 0610979 | 8/1994 | European Pat. Off. . |
| 2193271 | 2/1988 | United Kingdom . |

*Primary Examiner*—Rodney H. Bonck
*Assistant Examiner*—Saúl J. Rodriguez
*Attorney, Agent, or Firm*—Nils H. Ljungman and Associates

[57]  ABSTRACT

The invention relates to a transmission device which is located between the crankshaft of an engine and a clutch and is designed with a flexible plate in contact with the crankshaft, and which can be connected to the flexible plate by means of connecting elements which are engaged from the crankshaft side via the flexible plate in a fastening element of the clutch and have a retaining part for the flexible plate, so that the installation of the fastening element and the flexible plate can be performed as quickly as possible and without causing any damage. For this purpose, the connecting elements with their retaining parts for the installation of the flexible plate project from the fastening element by a distance which exceeds the thickness of the flexible plate. The flexible plate is provided with through holes for the connecting elements, adjacent to each of which there is a corresponding guide slot running in the direction of movement relative to the installation motion of the fastening element relative to the flexible plate, whereby the width of the guide slot perpendicular to its longitudinal direction is approximately equal to the cross section of the connecting means which the latter have in the area where they pass through the flexible plate.

17 Claims, 10 Drawing Sheets

TRANSMISSION DEVICE FOR A MOTOR VEHICLE

BACKGROUND OF THE INVENTION

1. Field of the Invention

The present invention generally relates to a transmission device which is located between the crankshaft of an engine and a clutch, and is designed with a flexible plate in contact with the crankshaft. The transmission device can be connected to the flexible plate by means of connecting elements which are engaged from the crankshaft side via the flexible plate in a fastening element of the clutch and each of which has a retaining part for the flexible plate.

2. Background Information

U.S. Pat. No. 5,191,810 discloses a transmission device which is fastened to the crankshaft of an internal combustion engine and forms the connection to a clutch. The transmission device has a flexible plate fastened to the crankshaft, whereby the flexible plate is connected by means of screws to a flywheel which forms a fastening element of the clutch.

This connection between the flexible plate and the flywheel is conventionally achieved by first placing these parts together during assembly, inserting the screws through openings in the flexible plate whose diameters fit the shank of the screw, and tightening the screws into a corresponding threaded insert in the flywheel. On account of the limited access to the screws caused by the internal combustion engine, it is frequently impossible to use a mechanical screwdriver, or if a mechanical screwdriver can be used, it can essentially only be applied to the screws at an angle. In the former case, the screws must be generally tightened by hand, which is very time-consuming, while in the latter case the screws must be generally tightened at an angle, which can result in the destruction of the threaded inserts in the flywheel. In that case, the flexible plate is not optimally fastened to the flywheel.

OBJECT OF THE INVENTION

The object of the invention is to design the connection between a crankshaft-side flexible plate and a fastening element of a clutch so that the assembly can be performed as quickly as possible and without causing any damage.

SUMMARY OF THE INVENTION

The invention teaches that this object can be achieved by means of connecting elements having retaining parts for the installation of the flexible plate. The connecting elements preferably project from the fastening element of the clutch by a distance which exceeds the thickness of the flexible plate. The flexible plate is preferably provided with through holes for the connecting elements, adjacent to each of which there is a corresponding guide slot running in the direction of movement relative to the installation motion of the fastening element relative to the flexible plate. The width of the guide slot is preferably perpendicular to the longitudinal direction of the flexible plate and is also preferably approximately equal to the cross section of the area of the connecting elements that passes through the flexible plate.

By designing the openings in the flexible plate as through holes for the connecting elements, it becomes possible to incorporate the connecting elements into the fastening element (such as a flywheel, the primary mass on a two-mass flywheel, or the pump wheel of a torque converter) before the fastening element comes into contact during assembly with the flexible plate and before problems arise relating to access to the connecting point. It should be noted here that the depth of placement of the connecting elements into the fastening element may be limited as a function of the thickness of the flexible plate, since the retaining parts of the connecting elements, for the subsequent mounting of the flexible plate, should preferably remain at a distance from the fastening element which is at least equal to the thickness of the flexible plate. Pre-assembled in this manner, the fastening element is oriented for installation relative to the flexible plate so that the connecting elements are aligned with the through holes in the flexible plate, and can then be pressed toward the flexible plate until they come into contact with it. Then, a relative motion of the fastening element in relation to the flexible plate is preferably generated, to bring the connecting means into engagement with the guide slots. Since the guide slots essentially have a width perpendicular to their extension, which width only corresponds approximately to the cross section of the connecting elements inside the opening, the flexible plate, after the completion of the movement required for the assembly of the fastening element described above, is essentially held by the retaining parts of the connecting elements in contact with the fastening element. Thus, the connecting elements essentially need only be slightly pulled toward the fastening element to achieve a frictional connection between the retaining parts of the connecting elements and the flexible plate in the areas on both sides of each guide slot. The assembly process can thus be completed without the possibility of damage during the connection between the flexible plate and the fastening element.

The above-mentioned movement required for assembly of the flexible plate relative to the fastening element can be executed as a rotation, for which purpose the guide slots preferably run in the circumferential direction of the flexible plate. However, the movement can also be executed as a pushing movement perpendicular to the axis of the fastening element, when the guide slots are parallel to one another. In the latter scenario, a centering in relation to the fastening element occurs only if there is already a slight frictional connection between the fastening element and the flexible plate created by the connection means.

As a result of a narrower neck between the through hole and the corresponding guide slot, a slight resistance is essentially generated before the connecting elements finally arrive in the guide slot. After this resistance is overcome, the installer can be certain that he is tightening the connecting means only when they are actually inside the guide slots. For this purpose, there is also preferably a collar provided in the peripheral area of the through hole, which collar can prevent the tightening of the connecting means as long as they are inside the respective through hole. An advantageous feature of the present invention is disclosed herebelow whereby a spacer can be incorporated into the flexible plate, thereby making it possible, for example, to have a rivet or peg fastened in the flexible plate. After the engagement of the connecting means in the guide slots, a reverse motion of the flexible plate should preferably be prevented, e.g. the motion which could occur as a result of vibrations between the flexible plate and the fastening element, until the connecting elements are again in the through holes of the flexible plate. For this purpose, the openings or through holes are preferably closed by lugs provided on the fastening element. The lugs, when there is a relative movement between the fastening element and the flexible plate, come into contact with the flexible plate, which acts in the peripheral region of the holes as a stop for the lug. Another feature of the invention is disclosed whereby the guide slots can be designed with a projection facing the retaining part of the connecting element whereby the projection acts as a stop for the respective connecting element.

In another advantageous embodiment of the present invention, a material displacement in the form of a bead can preferably be configured on the side of the mounting parts of the connecting elements or in the form of a lug having a large surface area. The projection can also be molded onto the flexible plate, e.g. by cutting or machining this side of the plate, or it can be attached to the plate by means of adhesive.

In addition to the securing elements described above, measures can be employed to prevent the connecting elements from coming loose. A force, for example, can be provided by spring means, which force can help to keep the connecting elements in frictional contact with the flexible plate. The present invention also teaches the advantageous configurations of the spring means, as well as preferred arrangements of the spring means relative to the connecting elements.

In accordance with an additional feature of the present invention, according to at least one preferred embodiment, it can be advantageous, with a realization of the connecting elements on the one hand, and of the flexible plate on the other hand, to make the connection between the flexible plate and the fastening element with the least possible installation effort, and to secure the connecting means from coming loose. In a particularly advantageous embodiment of the present invention, with regard to the connecting elements, the stay bolts are preferably in a threaded connection with the fastening element and are cast or sealed into the fastening element, or can be riveted to the fastening element.

It should be understood that when the word "invention" is used in this application, the word "invention" includes "inventions," that is, the plural of "invention." By stating "invention," applicant does not in any way admit that the present application does not include more than one patentably and non-obviously distinct invention, and maintains the possibility that this application may include more than one patentably and non-obviously distinct invention. The applicant hereby asserts that the disclosure of this application may include more than one invention, and, in the event that there is more than one invention, that these inventions may be patentable and non-obvious, one with respect to the other.

One aspect of the invention resides broadly in a transmission system for a motor vehicle, the transmission system comprising a manual transmission comprising: a flywheel having a circumference and a longitudinal axis, the circumference of the flywheel being disposed concentrically about the longitudinal axis; a clutch pressure plate being releasably engageable with the flywheel; a clutch disc being disposed between the clutch pressure plate and the flywheel; the clutch disc comprising: a friction lining for contacting the clutch pressure plate and the flywheel; the clutch pressure plate being axially movable and for causing the clutch disc to engage and disengage with the flywheel; a clutch housing disposed adjacent the clutch pressure plate; the flywheel having a disk-like portion extending from the longitudinal axis to the circumference; the transmission system further comprising: a crankshaft apparatus having one end facing toward the flywheel and an end opposite the one end facing away from the flywheel; a flexible automatic transmission drive plate having a thickness dimension and being disposed between and in contact with the flywheel and the crankshaft apparatus; connecting means for connecting the flexible automatic transmission drive plate and engaging with crankshaft apparatus to fasten the flexible automatic transmission drive plate to the crankshaft apparatus; connecting elements for fastening the flexible automatic transmission drive plate to the flywheel; the flexible automatic transmission drive plate being fastened by the connecting elements to the flywheel; each connecting element having a head and a shank connected to the head; the shanks of the connecting elements being disposed at least partially in the flywheel; the heads projecting and extending beyond the surface of the flywheel at a distance greater than the thickness of the flexible automatic transmission drive plate prior to complete assembly of the transmission system; the flexible automatic transmission drive plate for being placed between the flywheel and the heads of the connecting elements; the flexible automatic transmission drive plate comprising: a plurality of apertures disposed in the flexible automatic transmission drive plate; the apertures extending through the flexible automatic transmission drive plate; each aperture comprising a first portion and a second portion; the first portion being disposed and dimensioned to permit the heads of the connecting elements to pass through the apertures; the second portion being disposed and dimensioned to retain connecting elements in the apertures by permitting the heads of the connecting elements to be tightened against and to bear against the second portion during assembly of the transmission system; the flywheel and the flexible automatic transmission drive plate being positioned for movement relative to one another to permit movement of the heads of the connecting elements into the first portion during assembly of the transmission system; the position of the heads in the flywheel having been positioned to have permitted relative movement of the heads of the connecting elements relative to the flexible automatic transmission drive plate from the first portion into the second portion during assembly of the transmission system; the connecting elements having been disposed during assembly of the transmission system to permit the movement of the heads to the second portion and to permit the heads to be tightened against and to bear against the second portion; the crankshaft apparatus being disposed in an engine; and the transmission system comprising the engine connected to the manual transmission by the flexible automatic transmission drive plate.

Another aspect of the invention resides broadly in a method of manufacturing a transmission system for a motor vehicle, said transmission system comprising a manual transmission; the manual transmission comprising: a flywheel having a circumference and a longitudinal axis, the circumference of the flywheel being disposed concentrically about the longitudinal axis; a clutch pressure plate being releasably engageable with the flywheel; a clutch disc being disposed between the clutch pressure plate and the flywheel; the clutch disc comprising: a friction lining; the friction lining for contacting the clutch pressure plate and the flywheel; the clutch pressure plate being axially movable and for causing the clutch disc to engage and disengage with the flywheel; a clutch housing disposed adjacent the clutch pressure plate; the flywheel having a disk-like portion extending from the longitudinal axis to the circumference; the transmission system further comprising: a crankshaft apparatus having one end facing toward the flywheel and an end opposite the one end facing away from the flywheel; a flexible automatic transmission drive plate having a thickness dimension and being disposed between and in contact with the flywheel and the crankshaft apparatus; connecting means for connecting the flexible automatic transmission drive plate and engaging with the crankshaft apparatus to fasten the flexible automatic transmission drive plate to the crankshaft apparatus; connecting elements for fastening the flexible automatic transmission drive plate to the flywheel; the flexible automatic transmission drive plate being fastened by the connecting elements to the flywheel; each connecting element having a head and a shank connected to the head; the shanks being disposed at least partially in the flywheel; the heads projecting and extending beyond the surface of the flywheel at a distance greater than the thickness of the flexible automatic transmission drive plate prior to complete assembly of the transmission system; the flexible automatic transmission drive plate for being placed between the flywheel and the heads of the connecting elements; the flexible automatic transmission drive plate comprising: a plurality of apertures disposed in the flexible automatic transmission drive plate; the apertures extending through the flexible automatic transmission drive plate; each aperture comprising a first portion and a second portion; the first portion being disposed and dimensioned to permit the heads of the connecting elements to pass through the apertures; the second portion being disposed and dimensioned to retain the connecting elements in the apertures by permitting the heads of the connecting elements to be tightened against and to bear against the second portion during assembly of the transmission system; the flywheel and the flexible automatic transmission drive plate being positioned for movement relative to one another to permit movement of the heads of the connecting elements into the first portion during assembly of the transmission system; the position of the heads in the flywheel having been positioned to have permitted movement of the heads of the connecting elements relative to the flexible automatic transmission drive plate from the first portion into the second portion during assembly of the transmission system; the connecting elements having been disposed during assembly of the transmission system to permit the movement of the heads to the second portion and to permit the heads to be tightened against and to bear against the second portion; the crankshaft apparatus being disposed in an engine; and the transmission system comprising the engine connected to the manual transmission by the flexible automatic transmission drive plate; the method comprising the steps of: providing a flywheel having a circumference and a longitudinal axis, the circumference of the flywheel being disposed concentrically about the longitudinal axis, the flywheel having a disk-like portion extending from the longitudinal axis to the circumference; providing a clutch pressure plate for being releasably engageable with the flywheel; providing a clutch disc; providing a friction lining for contacting the clutch pressure plate and the flywheel; the clutch pressure plate for being axially movable, the clutch pressure plate for causing the clutch disc to engage and disengage with the flywheel; providing a clutch housing; providing a crankshaft apparatus having a first end and a second end; the first end of the crankshaft apparatus for being adjacent the flywheel and the second end of the crankshaft apparatus for facing away from the flywheel; providing a flexible automatic transmission drive plate having a thickness dimension; providing a connecting device; connecting device being for connecting the flexible automatic transmission drive plate and engaging with the crankshaft apparatus for fastening the flexible automatic transmission drive plate to the crankshaft apparatus; providing connecting elements for fastening the flexible automatic transmission drive plate to the flywheel; each connecting element having a head and a shank connected to the head; the flexible automatic transmission drive plate for being placed between the flywheel and the heads of the connecting elements; providing the flexible automatic transmission drive plate with a plurality of apertures extending through the flexible automatic transmission drive plate; each of the apertures comprising a first portion and a second portion; the first portion to permit the heads of the connecting elements to pass through the apertures; the second portion to retain the connecting elements in the apertures by permitting the heads of the connecting elements to be tightened against and to bear against the second portion during assembly of the transmission system; the crankshaft apparatus being disposed in an engine; the method comprising the steps of: disposing the clutch disc between the clutch pressure plate and the flywheel; disposing the friction lining in a position to contact the clutch pressure plate and the flywheel; disposing the clutch pressure plate to be axially movable, disposing the clutch pressure plate for causing the clutch disc to engage and disengage with the flywheel; disposing the clutch housing adjacent the clutch pressure plate; disposing the first end of the crankshaft apparatus adjacent the flywheel and disposing the second end of the crankshaft apparatus away from the flywheel; disposing the flexible automatic transmission drive plate between and in contact with the flywheel and the crankshaft apparatus; connecting the connecting means to engage with the crankshaft apparatus and to fasten the flexible automatic transmission drive plate to the crankshaft apparatus; disposing the shanks of the connecting elements at least partially in the flywheel; disposing the heads to project and extend beyond the surface of the flywheel at a distance greater than the thickness of the flexible automatic transmission drive plate prior to complete assembly of the transmission system; disposing the flexible automatic transmission drive plate adjacent the flywheel and the heads of the connecting elements; positioning the heads in the flywheel to permit movement of the heads of the connecting elements relative to the flexible automatic transmission drive plate from the first portion into the second portion; positioning the flywheel and the flexible automatic transmission drive plate to be moved one relative to the other to permit movement of the heads of the connecting elements into the first portion; moving the heads of the connecting elements into the first portion; moving the heads of the connecting elements relative to the flexible automatic transmission drive plate from the first portion into the second portion; tightening the heads against the second portion of the apertures so that the heads bear against the second portion of the apertures; and disposing the crankshaft apparatus in an engine whereby a manual transmission-engine unit is produced.

Yet another aspect of the invention resides broadly in a method of manufacturing a transmission system for a motor vehicle, the transmission system comprising: a manual transmission; crankshaft apparatus having one end facing toward the manual transmission and an end opposite the one end facing away from the manual transmission; a flexible drive plate having a thickness dimension and being disposed between and in contact with the manual transmission and the crankshaft apparatus; connecting device for connecting the flexible drive plate and engaging with the crankshaft apparatus to fasten the flexible drive plate to the crankshaft apparatus; connecting elements for fastening the flexible drive plate to the manual transmission; the flexible drive plate being fastened by the connecting elements to the manual transmission; each connecting element having a head and a shank connected to the head; the shanks of the connecting elements being disposed at least partially in the manual transmission; the heads projecting and extending beyond the surface of the manual transmission at a distance greater than the thickness of the flexible drive plate prior to complete assembly of the transmission system; the flexible drive plate for being placed between the manual transmission and the heads of the connecting elements; the flexible drive plate comprising: a plurality of apertures disposed in the flexible drive plate; the apertures extending through the flexible drive plate; each aperture comprising a first portion and a second portion; the first portion being disposed and dimensioned to permit the heads of the connecting elements to pass through the apertures; the second portion being disposed and dimensioned to retain the connecting elements in the apertures by permitting the heads of the connecting elements to be tightened against and to bear against the second portion during assembly of the transmission system; the manual transmission and flexible drive plate being positioned for movement relative to one another to permit movement of the heads of the connecting elements into the first portion during assembly of the transmission system; the position of the heads in the manual transmission having been positioned to have permitted movement of the heads of the connecting elements relative to the flexible drive plate from the first portion into the second portion during assembly of the transmission system; the connecting elements having been disposed during assembly of the transmission system to permit the movement of the heads to the second portion and to permit the heads to be tightened against and to bear against the second portion; the crankshaft apparatus being disposed in an engine; and the transmission system comprising the engine connected to the manual transmission by the flexible drive plate; the method comprising the steps of: providing a manual transmission; providing crankshaft apparatus having a first end and a second end; the first end of the crankshaft apparatus for being adjacent the manual transmission and the second end of the crankshaft apparatus for facing away from the manual transmission; providing a flexible drive plate having a thickness dimension; providing connecting means for connecting the flexible drive plate and engaging with the crankshaft apparatus for fastening the flexible drive plate to the crankshaft apparatus; providing connecting elements; the connecting elements for fastening the flexible drive plate to the manual transmission; each connecting element having a head and a shank connected to the head; the flexible drive plate for being placed between the manual transmission and the heads of the connecting elements; providing the flexible drive plate with a plurality of apertures extending through the flexible drive plate; each of the apertures comprising a first portion and a second portion; the first portion to permit the heads of the connecting elements to pass through the apertures; the second portion to retain the connecting elements in the apertures by permitting the heads of the connecting elements to be tightened against and to bear against the second portion during assembly of the transmission system; the crankshaft apparatus being disposed in an engine; the method comprising the further steps of: disposing the first end of the crankshaft apparatus adjacent the manual transmission and disposing the second end of the crankshaft apparatus away from the manual transmission; disposing the flexible drive plate between and in contact with the manual transmission and the crankshaft apparatus; connecting the connecting device to engage with the crankshaft apparatus and to fasten the flexible drive plate to the crankshaft apparatus; disposing the shanks of the connecting elements at least partially in the manual transmission; disposing the heads to project and extend beyond the surface of the manual transmission at a distance greater than the thickness of the flexible drive plate prior to complete assembly of the transmission system; disposing the flexible drive plate adjacent the manual transmission and the heads of the connecting elements; positioning the heads in the manual transmission to permit movement of the heads of the connecting elements relative to the flexible drive plate from the first portion into the second portion; positioning the manual transmission and the flexible drive plate to be moved one relative to the other to permit movement of the heads of the connecting elements into the first portion; moving the heads of the connecting elements into the first portion; moving the heads of the connecting elements relative to the flexible drive plate from the first portion into the second portion; tightening the heads against the second portion of the apertures so that the heads bear against the second portion of the apertures; and disposing the crankshaft apparatus in an engine whereby a manual transmission-engine unit is produced.

BRIEF DESCRIPTION OF THE DRAWINGS

The invention is explained in greater detail below with reference to the embodiments illustrated in the accompanying drawings in which:

FIG. 24c shows another view of FIG. 24a;

DESCRIPTION OF THE PREFERRED EMBODIMENT

Figure 1:
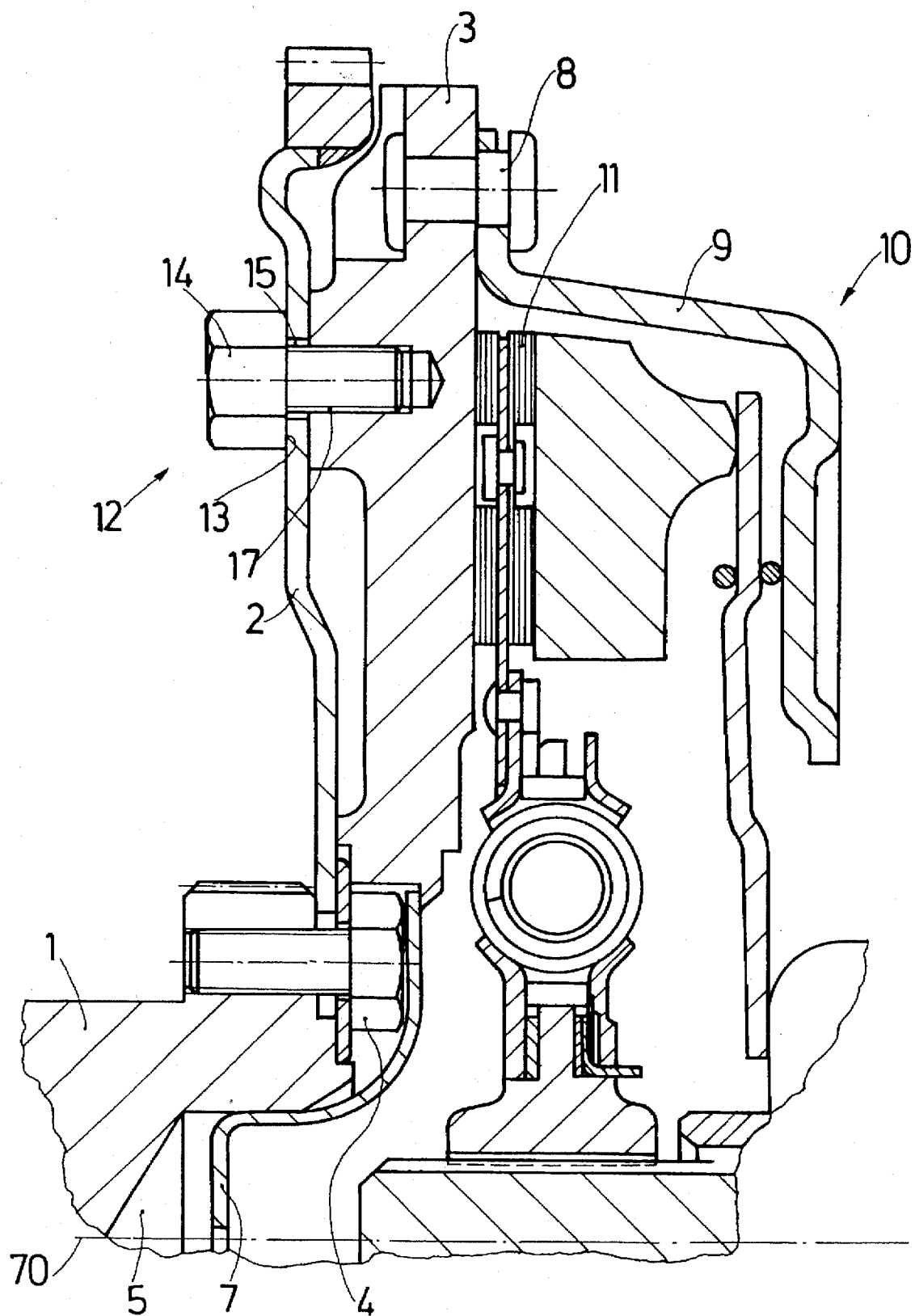
FIG. 1 shows a transmission device with a flexible plate and a fastening element of a clutch in the form of a flywheel in longitudinal section.

FIG. 1 shows a transmission device which is fastened to a crankshaft 1 of an engine, preferably an internal combustion engine, and has a flexible plate 2 and a fastening element in the form of a flywheel 3. The plate 2 is held by means of screws 4 in contact with the crankshaft 1, and both in the vicinity of its radially inner end, and also radially farther outward, is in contact with the flywheel 3, which can be centered relative to the crankshaft 1 in a ring 7 engaged in a recess 5 of the crankshaft 1, and which flywheel 3 can be fastened by means of a rivet connection 8 to the clutch housing 9 of a clutch 10, the clutch disc 11 of which is engaged on the side of the flywheel 3 away from the plate 2. The clutch 10 is designed in a conventional manner (e.g. as described in U.S. Pat. No. 5,191,810).

Figure 27:
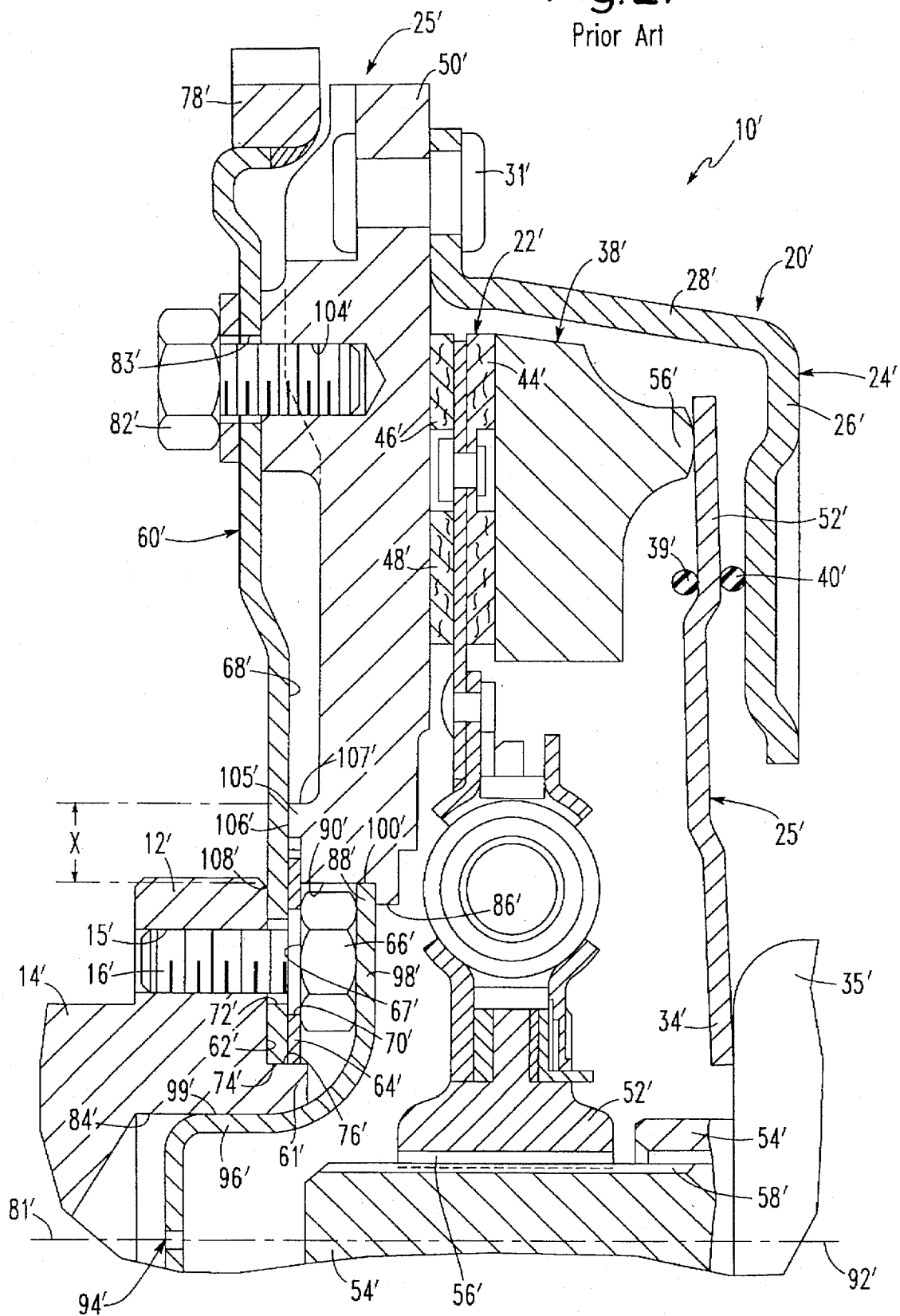
FIG. 27 shows a fragmentary vertical sectional view, partly in elevation, of the manual friction clutch of FIG. 25.

In a known method of assembly, the drive plate or flexible plate can essentially be attached to the transmission by a set of fasteners or machine bolts. Another known method of installation of the drive plate or flexible plate, as shown in FIG. 27, has each crankshaft free end of the flexible drive plate being provided with an axial blind bore 84' adapted to journally receive therein, in a conventional manner, one end of an automatic transmission casing central stub shaft portion in a conventional manner. In the known arrangement, as shown in FIG. 27, the modular clutch flywheel disc 50' is apparently formed with a central circular opening 86' bordered by an annular countersunk, recessed radially extending, locating wall portion 88' provided in the flywheel disc at one side, with this one side facing the drive plate 60'.

Figure 2:
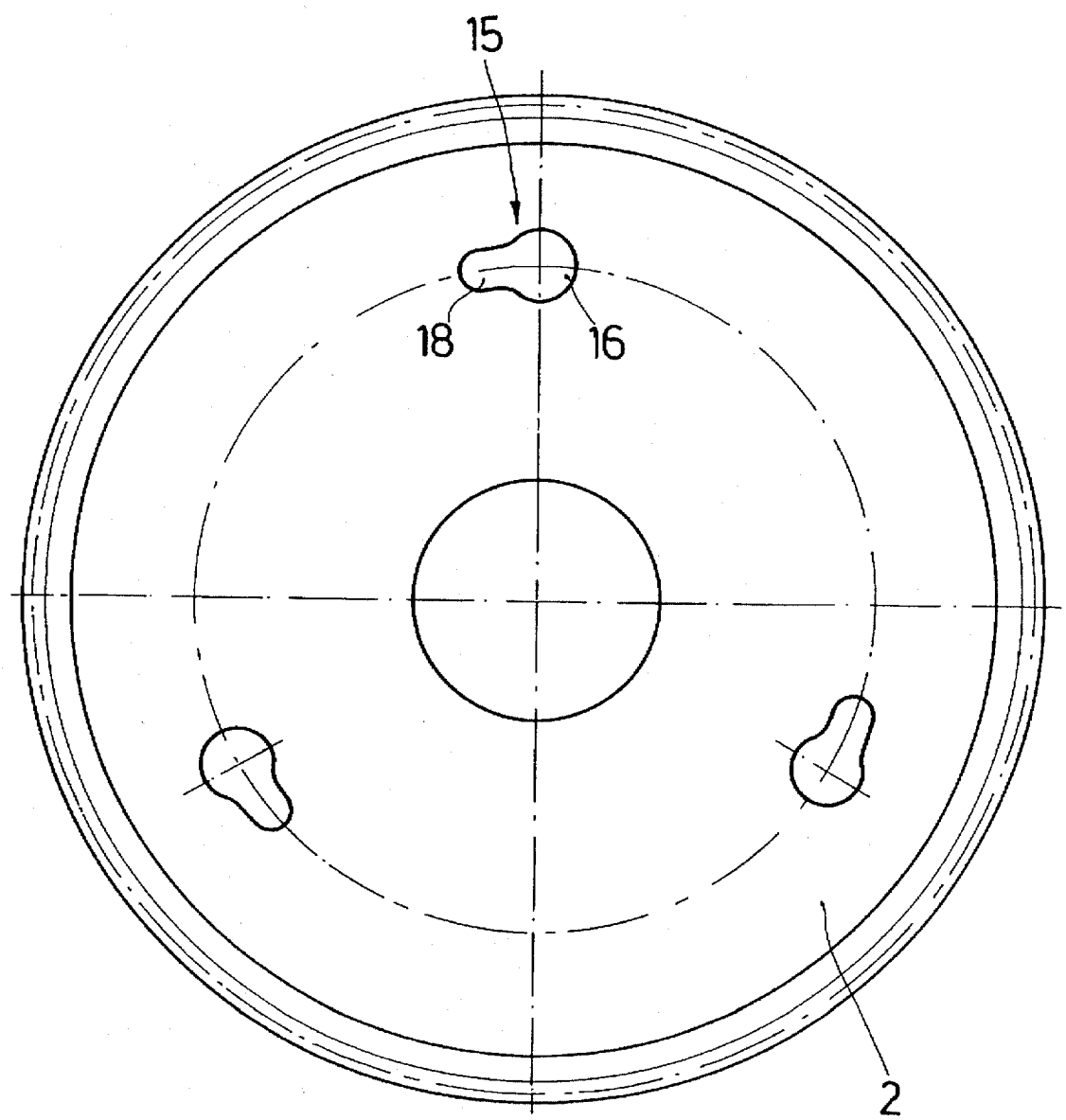
FIG. 2 shows the elastic plate which is provided with openings which extend in the circumferential direction and have a wider opening and a narrower guide slot.
Figure 3:
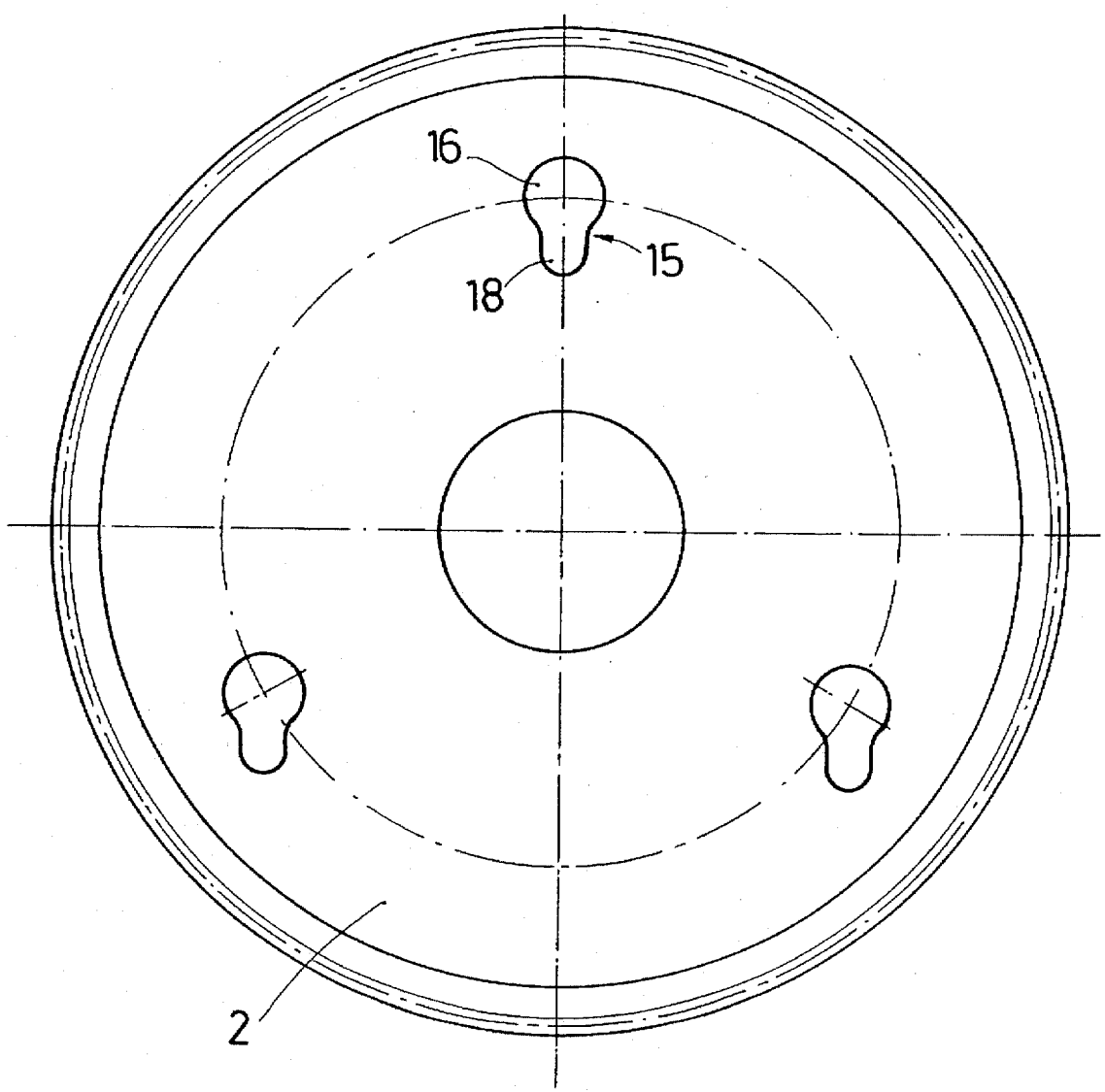
FIG. 3 is like FIG. 2, but with openings which run parallel to one another.
Figure 4:
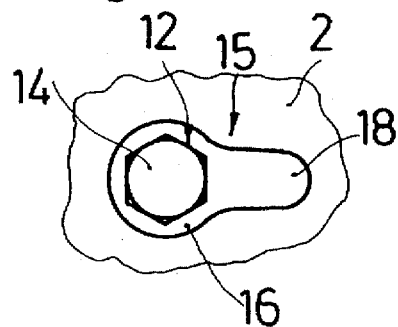
FIG. 4 shows one of the openings of the elastic plate with a connecting element.
Figure 5:
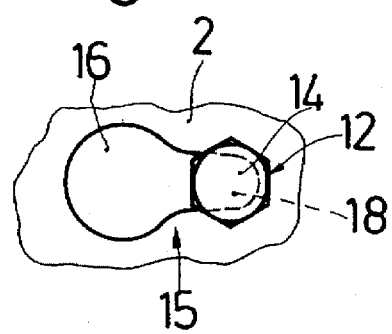
FIG. 5 is like FIG. 4, but with the connecting element in the guide slot of the opening.

As shown in FIG. 1, the elastic plate 2 can be connected to the flywheel 3 by means of connecting elements 12, e.g. by means of screws 14, each of which preferably has a retaining part 13 which can be placed in contact with the plate 2. For this purpose the flexible plate 2 can have a number of openings 15, which are spaced at equal intervals in relation to the axis of rotation of the plate 2. The shape of the openings 15 can correspond to that illustrated in FIGS. 2 and 3. Each of these openings 15 preferably has a through hole 16 for the corresponding screw 14, which screw 14 can preferably be engaged in a threaded hole 17 (FIG. 1) of the flywheel 3. Adjacent to this through hole 16, the diameter of which is preferably greater than that of the head of the screw 14, there is a guide slot 18, the width of which preferably approximately equals the diameter of the shank of the screw 14. The guide slots 18 all preferably extend, starting from the respective through hole 16, as shown in FIG. 2, in one direction of rotation, but as shown in FIG. 3 they can also be oriented parallel to one another. As a result of the openings 15 in the plate 2 shown in the illustration, the following assembly process becomes possible: The screws 14 are tightened into the threaded holes 17 just far enough so that the distance between the undersides of their heads, which act as the retaining parts 13, and the flywheel 3 is only slightly greater than the thickness of the plate 2. Then the flywheel 3 is oriented in relation to the plate 2 so that the screws 14 are aligned with the through holes 16 (FIG. 4). Then the flywheel 3 is placed in contact with the plate 2 by means of an axial movement, and when the guide slots 18 are oriented in the longitudinal direction as illustrated in FIG. 2, the flywheel is rotated until it reaches the end of the slot. On the other hand, when the guide slots 18 as illustrated in FIG. 3 are oriented perpendicular to the axis of rotation 70 of the plate 2, the flywheel 3 is pushed until it is centered on the plate 2. Then the screws 14 are tightened, whereby their retaining parts 13 come into contact in a frictional connection on both sides of each guide slot 18 against the plate 2 (FIG. 5).

Figure 6:
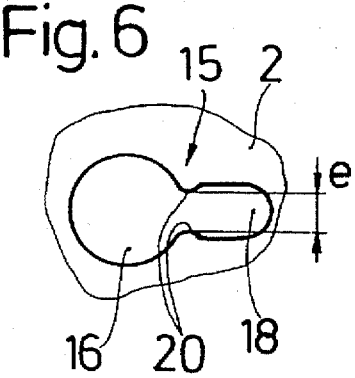
FIG. 6 is like FIG. 4, but with a narrower neck between the through holes and the guide slot of the opening.

To give the installer greater assurance that he has actually tightened the screws 14 only when they are engaged through the guide slot 18, the transitional area between the through hole 16 and the guide slot 18, as illustrated in FIG. 6, can be narrowed just enough so that this narrower neck 20 resists the shank of the screw 14 being pushed through with a slight resistance. After this resistance has been overcome, the shank of the screw 14 essentially slips into the guide slot 18, which is perceived by the installer as the "catching" of the flywheel 3 in the correct position relative to the plate 2.

As shown in FIG. 6, the transitional area between the through hole 16 and the guide slot 18 can preferably form a narrower neck 20. The purpose of the narrower neck is to resist the shank of the screw or bolt 14 upon the rotation or pushing movement during assembly. A device such as a pressure transducer may be suited to the automated assembly techniques of the present invention including the pushing and rotation movements. Such a pressure transducer can essentially aid in the installation of the flexible drive plate as it senses compression or tension in response to applied pressure. The pressure transducer can then indicate when the required resistance is essentially overcome thereby indicating that the connecting elements of the flywheel 3 are in the correct position relative to the plate 2.

Figure 7:
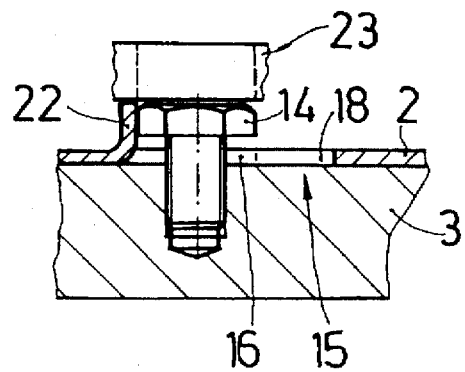
FIG. 7 shows the flexible plate with a collar molded in the vicinity of the through hole.
Figure 8:
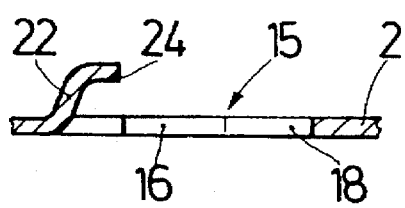
FIG. 8 is like FIG. 7, but with a collar formed by raising the free end of a bracket.
Figure 9:
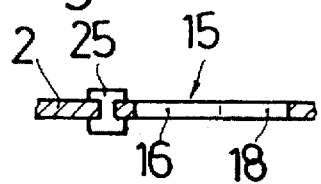
FIG. 9 is like FIG. 7, but with a collar formed by an inserted rivet.
Figure 8A:
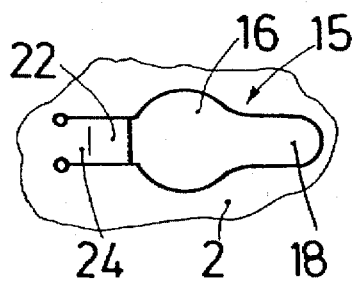
FIG. 8a is an overhead view of the collar and guide slot of FIG. 8.
Figure 10:
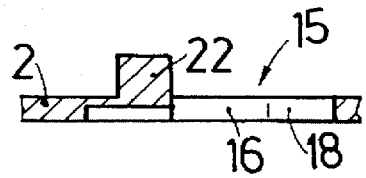
FIG. 10 is like FIG. 7, but with a collar formed by forging, extruding, pressing, injection molding, or stamping.
Figure 11:
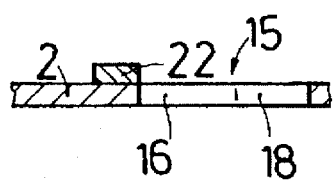
FIG. 11 is like FIG. 7, but with a collar attached by means of an adhesive connection.

Since, during the installation, before the tightening of the screws 14, the flywheel 3 should preferably be moved by a rotation relative to the plate 2, until the screws 14 are engaged through the guide slots 18, it is appropriate to prevent an unintentional tightening of the screws 14 prior to when this relative motion has been executed. For this purpose, as shown in FIG. 7, there can be a collar 22 in the peripheral area of the through hole 16, on the side facing the head of the screw 14, which prevents the application of a schematically illustrated tool 23, e.g. a screwdriver, to the head of the screw 14. As shown in FIGS. 8 and 8a, the collar can be formed by shaping a bracket 24 in the peripheral area of the through hole 16. The bracket 24 can be shaped by means of a punching process, so that a free end facing the through hole 16 can be raised above the plate 2. Likewise, FIG. 9 illustrates the possible installation of a spacer 25, such as a rivet, which projects beyond the plate 2, and FIG. 10 illustrates a forging, pressing, or stamping of the collar 22. FIG. 11 illustrates the attachment of the collar 22 to the plate 2 by means of adhesive.

During installation, before tightening the screws or the bolts 14, the flywheel 3 is preferably to be moved relative to the flexible drive plate 2. It is highly desirable to prevent any unintentional tightening of the screws or bolts 14 before the screws or bolts 14 are positioned in the guide slots 18. The collar 22, as shown in FIG. 7, is preferably located adjacent the through hole 16 but opposite the guide slot 18. Such placement of collar 22 can generally ensure proper installation by preventing the assembly system from applying the screwdriver or bolt driver 23, as shown in FIG. 7, thereby making it generally impossible to tighten the screws or bolts 14 before the screws or bolts 14 are properly positioned in the guide slots 18.

Another means for ensuring proper installation of the flexible drive plate 2 is shown in FIG. 8 where the collar 22 is in the form of a bracket 24 disposed in the peripheral area of the through hole 16 or aperture. The free end of the bracket 24 preferably faces the through hole 16 and is raised above the flexible drive plate 2. Such placement of the bracket 24 essentially prevents the assembly system from applying the bolt driver 23, for example, as shown in FIG. 7, to the head of the bolt 14 before the bolt 14 is positioned in guide slot 18.

As shown in FIG. 9, a spacer 25 can perform the same function as collar 22 as it prevents the assembly system from applying a bolt driver 23, for example, to the head of the bolt 14 before being positioned in guide slot 18. The spacer 25 may be in the form of a rivet which projects beyond the flexible drive plate 2, as shown in FIG. 9.

FIG. 10 illustrates another means of ensuring the proper installation of the flexible drive plate by means of a collar 22. As shown in FIG. 10, the collar 22 can be formed by extruding, injecting, molding, forging, stamping, or pressing the metal of the flexible drive plate 2 so as preferably to cause a flow of the metal to form the shape of the collar 22. The metal is essentially plastically deformed thereby forming the collar 22.

Summarizing, the various embodiments of the present invention including the collar 22, the spacer 25, the forged, stamped, or pressed collar 22, as well as the adhesion of the collar 22 by glue, adhesive, or weld, may each essentially perform the same function of properly aligning the bolt driver or tool 23 of the assembly system to the head of the screw or bolt 14 thereby essentially ensuring the proper installation of the transmission device, i.e. when the screws or bolts 14 have been properly positioned within the guide slot 18.

Figure 12:
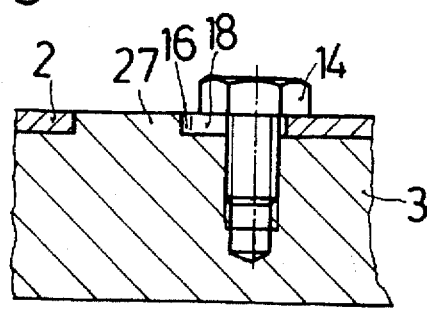
FIG. 12 is like FIG. 7, but with a lug molded on the flywheel and engaged in the opening of the flexible plate.
Figure 13:
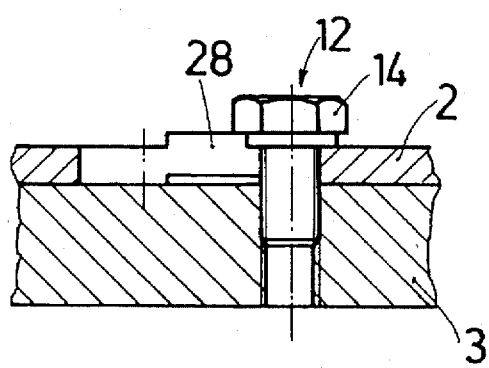
FIG. 13 is like FIG. 7, but with a projection on the side of the flexible plate away from the flywheel.
Figure 13A:
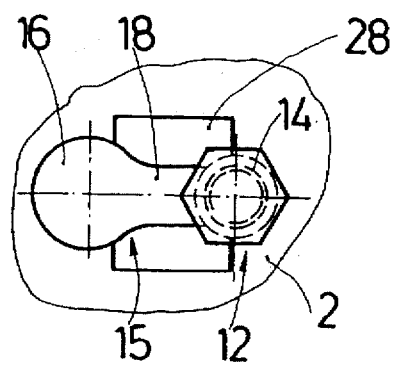
FIG. 13a shows another view of the projection as shown in FIG. 13.

If the screws 14 should come loose during the operation of the transmission device, precautions should preferably be taken so that the flywheel 3 does not wander toward the through holes 16 and come loose from the plate 2. As illustrated in FIG. 12, for this purpose there is preferably a lug 27 shaped on the flywheel 3 which lug 27 extends into the through hole 16 and forms a stop for the flywheel 3, in the event of a movement of the flywheel 3 relative to the plate 2. By means of this lug 27, the movement can be restricted so that the shank of the screw 14 essentially cannot leave the guide slot 18. Likewise, as shown in FIGS. 13 and 13a, there can also be at least one projection 28 on the side of the plate 2 facing the head of the screw 14 in the area between the through hole 16 and the guide slot 18. Such a projection 28 can be manufactured by the cutting or machining of this side of the plate 2, as shown in FIGS. 14 and 14a and FIGS. 15 and 15a, by pushing up the material to form a bead 29 or a projection 30, or as illustrated in FIGS. 16 and 16a, it can also be formed by raising the free end of brackets 31, whereby the free ends come into contact with the head of the screw 14.

During assembly it is highly desirable to prevent the flywheel 3 from moving out of position relative to the flexible drive plate 2. For this reason, as shown in FIG. 12, a lug 27 is preferably formed on the flywheel 3 and extends through the opening of the flexible drive plate 2. This lug 27 essentially acts as a stop for the flywheel 3 thereby retaining the flywheel 3 in its position relative to the flexible drive plate 2. The lug 27 essentially restricts movement of the shank of the bolt 14 thereby retaining the shank of the bolt 14 within the guide slot 18.

As shown in FIG. 13, the shank of the bolt 14 can be retained in the guide slot 18 by means of a projection 28. This projection 28 can be formed on the flexible drive plate 2, facing away from the flywheel 3. As shown in FIG. 13a, the projection 28 is disposed in the transitional area between the through hole 16 and the guide slot 18.

Figure 14:
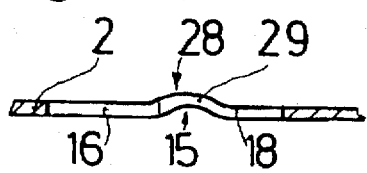
FIG. 14 shows the elastic plate, in the transitional region between the through hole and the guide slot, with a bead extending away from the flywheel.
Figure 14A:
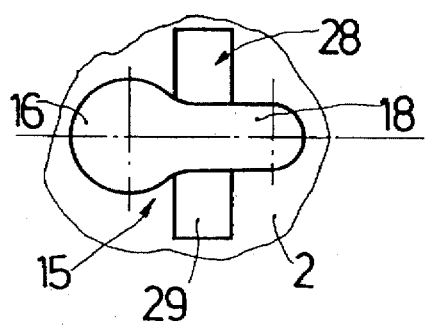
FIG. 14a shows another view of the bead in the elastic plate as shown in FIG. 14.

In the embodiment shown in FIGS. 13 and 13a, the projection 28 may be formed by machining or cutting the side of the flexible drive plate 2. As shown in FIGS. 14 and 14a, the material of the flexible drive plate 2 is pushed up to form a bead 29 disposed in the transitional area between the through hole 16 and the guide slot 18. This bead 29 essentially restricts the movement of the shank of the bolt 14 so that it essentially cannot slide out of its position within the guide slot 18.

Figure 15:
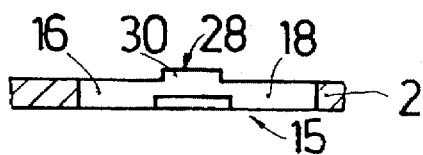
FIG. 15 is like FIG. 14, but with an extension formed in the transitional region.
Figure 15A:
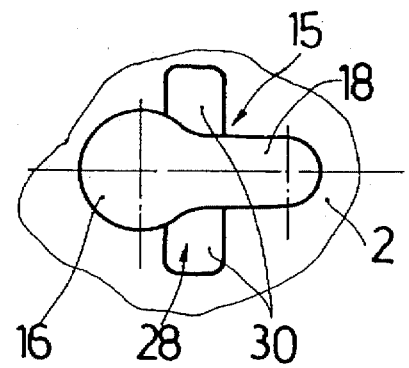
FIG. 15a shows another view of the projection as shown in FIG. 15.
Figure 16:
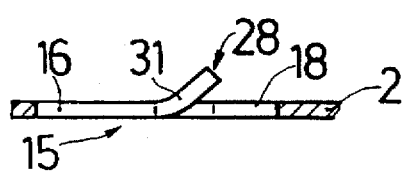
FIG. 16 is like FIG. 14, but with brackets formed in the transitional region and raised on the free end.
Figure 16A:
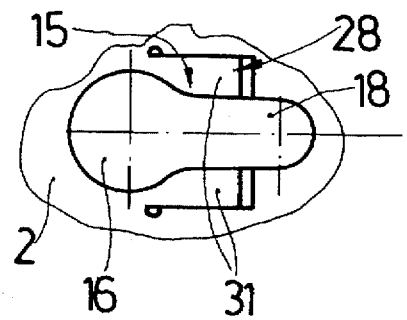
FIG. 16a shows another view of the bracket as shown in FIG. 16.

In the embodiment illustrated in FIG. 15, a projection 30 is cut into the side of the flexible drive plate 2 facing away from the flywheel 3. As shown in FIG. 15a, the projection 30 is placed adjacent the guide slot 18.

In the embodiment shown in FIG. 16, the raised end of a bracket 31 is formed with the flexible drive plate. As shown in FIG. 16a, the bracket 31 is placed adjacent the guide slot 18. Such placement of the bracket 31 makes it possible for the raised end of bracket 31 to essentially come into contact with the head of the bolt 14, as shown in FIG. 13.

Summarizing, it is highly desirable, during assembly of the transmission device, to retain the bolts 14 in their position within the respective guide slots 18. Otherwise, the flywheel 3 may separate from the through holes 16 causing the undesired effect of the flywheel 3 detaching from the flexible drive plate 2. For this reason, the embodiments including the lug 27, the projection 28, the bead 29, the projection 30, and the bracket 31 may each serve as alternatives to form as a stop for the flywheel 3 if there is an unintentional movement of the flywheel 3 relative to the flexible drive plate 2 during assembly of the transmission device. Each of the embodiments shown in FIGS. 12–16 serve the purpose of essentially restricting such unintentional movement so that the shank of the screw or bolt 14 cannot leave the guide slot 18.

Figure 17:
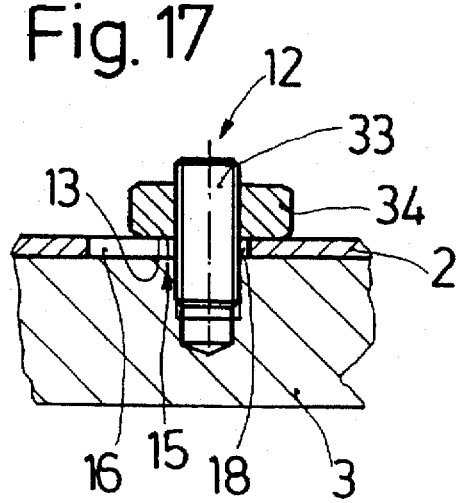
FIG. 17 shows a stay bolt embedded or countersunk into the flywheel by means of a threaded connection and acting as the connecting element.
Figure 18:
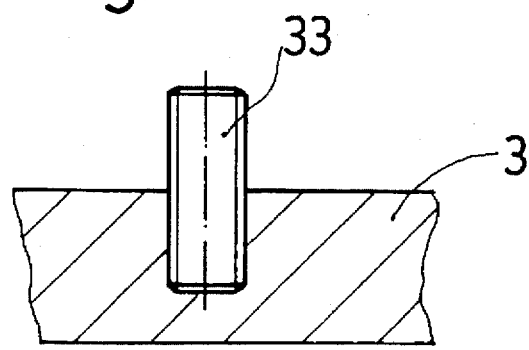
FIG. 18 is like FIG. 17, but with a stay bolt cast into the flywheel.
Figure 19:
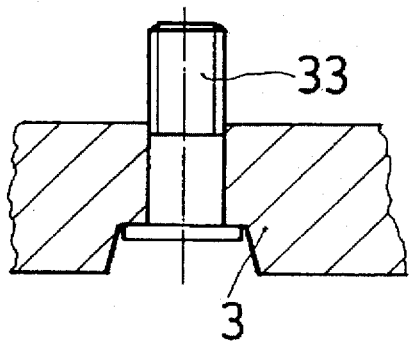
FIG. 19 is like FIG. 17, but with a stay bolt riveted in from the rear side of the flywheel.
Figure 20:
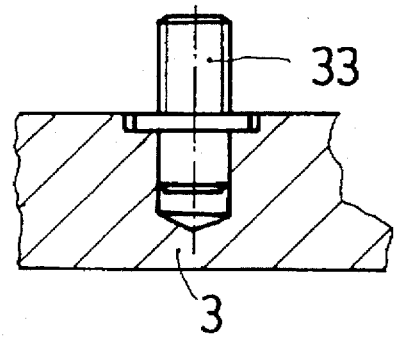
FIG. 20 is like FIG. 17, but with a stay bolt inserted by blind riveting into the flywheel.

In the embodiment described so far, the screws 14 have been used as the connecting elements 12. But, as shown in FIG. 17, it is also possible to insert stay bolts 33 into the flywheel 3. The stay bolts can be screwed in as shown in FIG. 17, cast in as shown in FIG. 18, or rivetted in as shown in FIGS. 19 and 20. FIG. 19 shows a stay bolt 33 which is fastened by means of riveting executed on the side of the flywheel 3 facing away from the plate 2, while the stay bolt 33 illustrated in FIG. 20 is fixed in the plate 2 by means of blind riveting. The stay bolts 33 preferably interact with a nut 34 (FIG. 17) placed on a threaded portion of the stay bolt 33, and on which the retaining portion 13 which acts on the plate 2 is configured.

Figure 21:
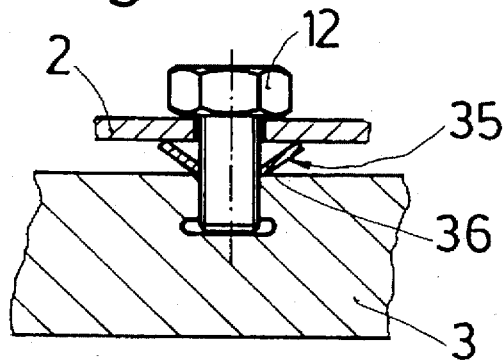
FIG. 21 shows the flywheel and the elastic plate with spring means located between them.
Figure 22:
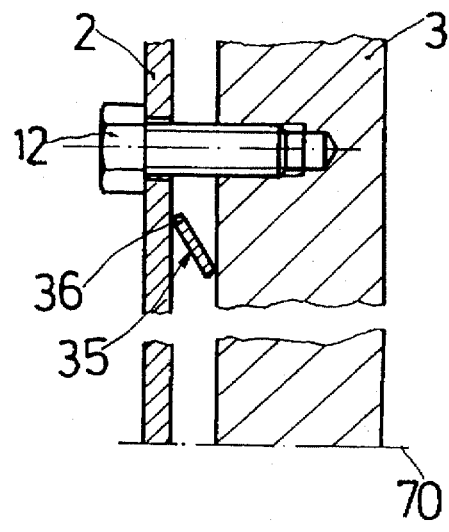
FIG. 22 is like FIG. 21, but with spring means surrounding the axis of rotation of the flywheel.
Figure 23:
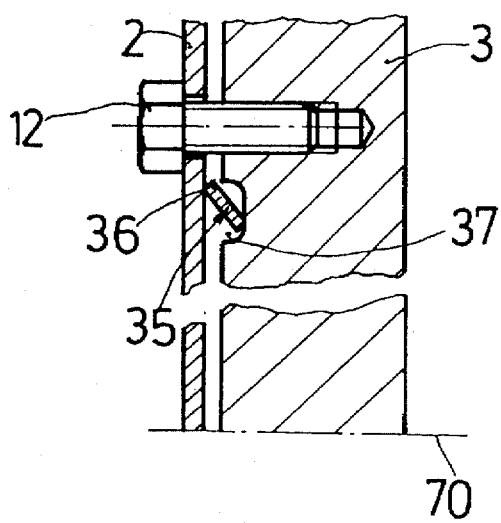
FIG. 23 is like FIG. 22, but with the spring means in a recess in the flywheel.

The risk of a loosening of the respective connecting elements 12, and the risk of a backing of the flywheel 3 into the position in which the connecting elements 12 are aligned with the through holes 16 in the flexible plate 2, in addition to employing the solutions described above, can also be reduced by locating spring means 35 between the plate 2 and the flywheel 3, as illustrated in FIG. 21. By means of the spring means 35, the plate 2 is held in frictional contact with the respective retaining part 13. The preferred spring means 35 are spring plates 36, which can surround either the respective connecting element 12 or, as illustrated in FIG. 22, can surround the axis 70 of the plate 2 with a predetermined radius. The spring plate 36 can thereby be installed as illustrated in FIG. 22 on the flywheel 3, or as illustrated in FIG. 23 in a recess 37 on the flywheel 3.

Figure 24A:
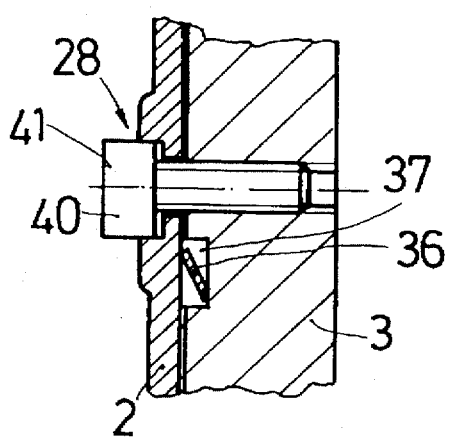
FIG. 24a shows an additional realization of the connecting element with a rectangular head and the elastic plate with a rectangular through hole.
Figure 24C:
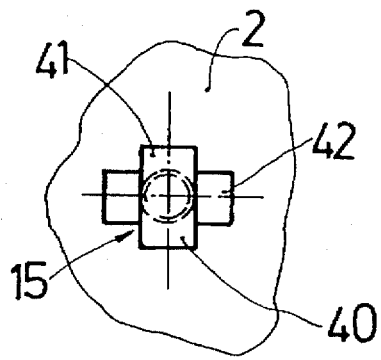
Figure 24B:
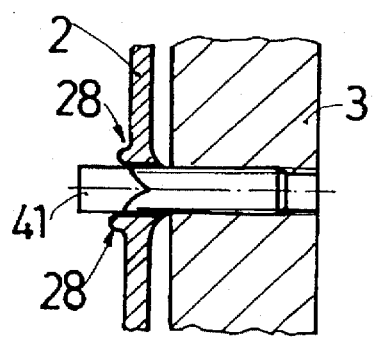
FIG. 24b shows another view of FIG. 24a with projections 22 in the flexible drive plate.

FIGS. 24a, 24b, and 24c illustrate additional embodiments from various perspectives, in which the connecting element 12 is formed by a screw 40 with a rectangular-shaped head 41. The openings 15 in the plate 2 are designed for such screws 40 with through holes 42 which have a rectangular cross section for the rectangular-shaped heads 41 of the screws 40. The heads, after being inserted into the through holes 42, are preferably rotated around the longitudinal axes of the screws 40 by about 90 degrees, and then lie on both sides of the through holes 42 with their retaining parts 13 on the plate 2. The plate 2 can be supported on its opposite side by means of a spring plate 36 on the flywheel 3. To keep the screws 40 from backing out of this retaining position, there are projections 28 formed on the side of the plate 2 facing the rectangular-shaped heads 41, on both sides of each head.

The additional embodiments of the present invention that are shown in FIGS. 24a, 24b, and 24c illustrate an alternative connecting element in the form of a screw 40 having a rectangular-shaped head 41. In FIG. 24c, the openings 15 are the apertures in the flexible drive plate designed to receive the screws 40. After insertion of the screws 40, the screws 40 are then preferably rotated by about 90 degrees around the longitudinal axis, thereby making it possible to lock the screws 40 against both sides of their corresponding rectangular through holes 42. An additional securing of this locking action is gained by means of the projections 28, as shown in FIG. 24b, which are formed on the side of the flexible plate 2 and secure the screws 40 in position.

If, instead of a conventional friction clutch, a two-mass flywheel is to be fastened to the flexible plate 2, the fastening element can preferably be formed by the primary mass of the two-mass flywheel. If a torque converter is to be attached to the flexible plate, on the other hand, the fastening element can preferably be formed by the pump wheel.

In that case, the attachment of the fastening element in question to the flexible plate can be made using exactly the same procedure as described in detail above with reference to the flywheel 3.

The clutch 10 can be designed in the conventional manner as described in U.S. Pat. No. 5,191,810 and is described here in further detail. The invention relates to a manual transmission clutch for automotive vehicles and more particularly to a modular friction clutch unit which is pre-assembled and balanced off line before installation. The modular friction clutch unit is designed such that the installation may be performed on a common production line in an interchangeable manner for both manual transmission equipped cars as well as automatic transmission equipped cars.

This connection between the flexible plate and the flywheel is conventionally achieved by first placing these parts together during assembly, and then inserting the screws through openings in the flexible plate whose diameters fit the shank of the screw and tightening the screws into a corresponding threaded insert in the flywheel. On account of the limited access to the screws caused by the internal combustion engine, it is frequently impossible to use a mechanical screwdriver, or if a mechanical screwdriver can be used, it can only be applied to the screws at an angle. In the former case, the screws must be tightened by hand, which is very time-consuming, while in the latter case the screws must be tightened at an angle, which can result in the destruction of the threaded inserts in the flywheel. In that case, the flexible plate is not optimally fastened to the flywheel.

Figure 25:
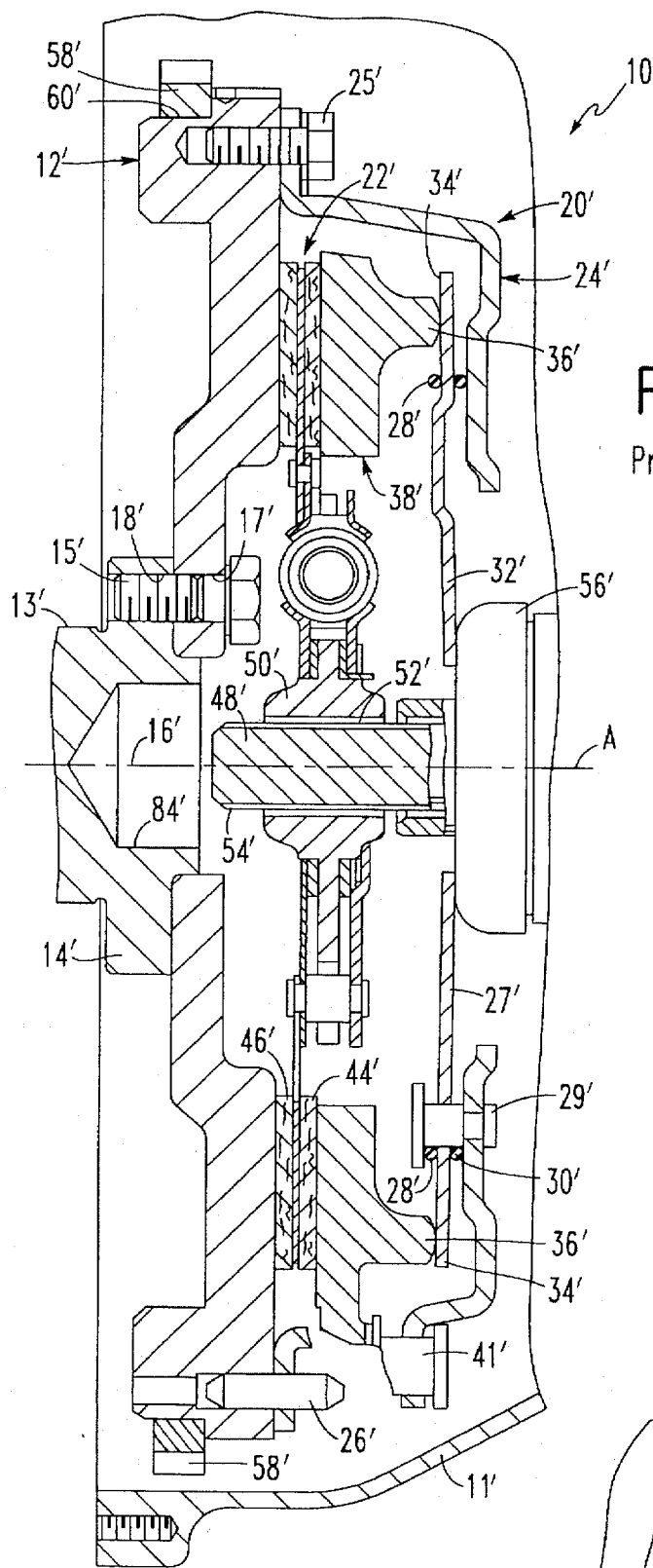
FIG. 25 shows a fragmentary vertical cross section, partly in elevation, of a known manual transmission modular clutch.

An example of a conventional mounting arrangement used in vehicle assembly plants for installing a manual transmission friction clutch on an engine crankshaft is disclosed in FIG. 25. FIG. 25 shows a conventional production friction clutch assembly 10', located within a manual transmission housing 11', having a flywheel 12' connected to and rotatably driven by a prime mover such as an automotive engine (not shown). The flywheel 12' is mounted on the output end of an engine crankshaft 13' by means of radial collar 14' formed thereon. A plurality of machine bolts 15' are arranged in a circle about transmission and clutch axis A coaxial with the crankshaft axis of revolution 16' with the bolts 15' extending through associated circumferentially distributed flywheel holes 17' for engagement in aligned threaded collar bores 18'.

As shown in FIG. 25, the clutch assembly 10' comprises a clutch cover and pressure plate assembly 20', a disc assembly 22', and the flywheel 12'. The clutch cover and pressure plate assembly 20' includes a clutch cover 24', suitably secured to the flywheel 12', such as by circumferentially distributed bolts 25', and carries pivot ring retaining studs 26' which are arranged in circle about the clutch axis A. The clutch cover and pressure plate assembly 20' further includes a diaphragm spring 27' provided with a first pivot ring 28', held by the heads of rivets 29' and a second identical pivot ring 30' held between the diaphragm spring 27' and the clutch cover 24'.

The diaphragm spring 27' includes a central portion, fragmented into radially inwardly projecting spring fingers, partially indicated at 32' and a radially outermost main spring section 34' which normally bears against adjacent projections 36' of pressure plate 38'.

Figure 26:
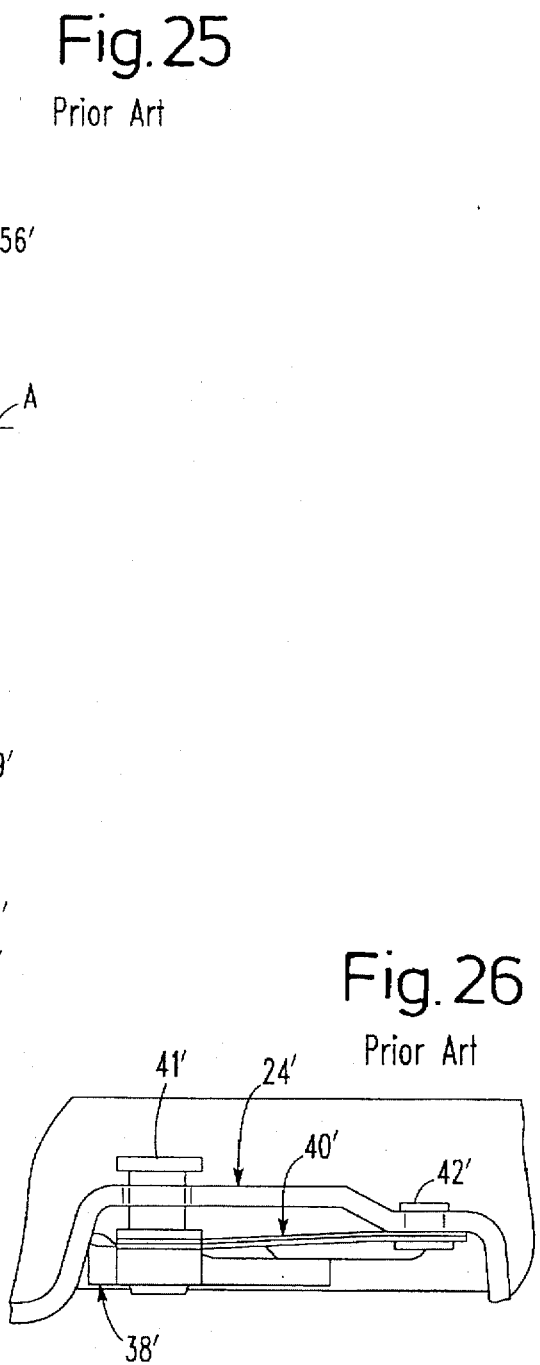
FIG. 26 shows a fragmentary radially inward elevational view of a known manual transmission modular clutch.

As seen in FIGS. 25-27 the cover assembly 20' is axially movably secured to the base of clutch cover 24' by a set of substantially tangentially extending leaf spring strips 40' with each set secured at one end to the pressure plate 38' by rivet 41' and secured at the opposite end to the clutch cover 24' by rivet 42'. The leaf spring strips 40' allow for a limited axial movement of the pressure plate 38' while permitting the transfer of torque between the clutch cover 24' and the pressure plate 38'. The pressure plate 38' is normally biased against the adjacent one friction lining 44' of the disc assembly 22' by the diaphragm spring radially outermost main section 34' which normally bears against the adjacent projections 36' of the pressure plate 38'. The other friction lining 46' of the friction clutch disc assembly 22' then bears against the flywheel 12' and transmits torque to the transmission output shaft 48' through the medium of a hub 50" having internal splines 52' extending into complementary external splines 54' on the output shaft 48'. The fingers 32' can be engaged and shifted in the axial direction toward the flywheel 12' by a suitable thrust bearing 56'. At such time, the diaphragm main section spring 34' is tilted between the two pivot rings 28' and 30' in a conventional manner. It will be noted in FIG. 25 that starter ring gear 58' is suitably fixed to the flywheel 12' in a concentric manner relative to clutch axis "A" and crankshaft blind bore 84' by being seated in outer annular flywheel notched-out shoulder 60'.

It is a feature of the present invention to replace a conventional manual transmission clutch flywheel with a flywheel plate assembly comprising a driven flywheel plate and a pilot mounting plate. The invention involves a modular clutch assembly consisting of a clutch cover assembly, a clutch disc assembly and the flywheel assembly which may take place at an off-line or remote location such as a supplier's plant. The clutch cover assembly may be suitably attached, as by riveting or welding, to the flywheel plate assembly minimizing tooling cost while allowing the clutch disc assembly to be aligned on the modular clutch assembly. In the prior art, the modular clutch assembly was then adapted to be installed on the production line of a vehicle assembly plant by means of a crankshaft piloting arrangement.

One feature of the invention resides broadly in the transmission system comprising a manual transmission comprising a flywheel having a circumference and a longitudinal axis. The circumference of the flywheel being disposed concentrically about the longitudinal axis. A clutch pressure plate is releasably fastened to the flywheel and a clutch disc is disposed between a clutch pressure plate and the flywheel. A clutch housing is disposed adjacent the clutch pressure plate and is releasably attached to the flywheel having a disk-like portion extending from the longitudinal axis to the circumference. A crankshaft means having one end facing toward said flywheel and an opposite end facing away from the flywheel, characterized by the fact that connecting elements are engaged from the crankshaft side. A flexible drive plate is disposed between and in contact with the flywheel and the crankshaft to which the flexible drive plate is connected by fastening means. The connecting elements, each having a head and a shank attached to said head, are disposed in the flywheel and protrude from the surface of the flywheel at a distance greater than the thickness of the flexible drive plate. The flexible drive plate comprises through holes or apertures which extend through the flexible drive plate and comprise a first portion and a second portion. The first portion is disposed and dimensioned to permit the heads of connecting elements to pass through these apertures. The second portion is disposed and dimensioned to retain and secure the connecting elements by permitting the heads of the connecting elements to bear against and be tightened against the second portion during assembly of the transmission system. The flywheel and the flexible drive plate are configured for movement one relative to the other to permit movement of the heads of the connecting elements during assembly of the transmission system.

Another feature of the invention resides broadly in the transmission device which is located between the crankshaft of an engine and clutch and is designed with a flexible plate in contact with the crankshaft, and which can be connected to the flexible plate by means of connecting elements which are engaged from the crankshaft side via the flexible plate in a fastening element of the clutch and each of which has a retaining part for the flexible plate, characterized by the fact that the connecting elements 12 with their retaining parts 13 for the installation of the flexible plate 2 project from the flywheel 3 of the clutch by a distance which exceeds the thickness of the flexible plate 2, and the flexible plate 2 is provided with through holes 16 for the connecting elements 12, adjacent to each of which there is a corresponding guide slot 18 running in the direction of movement relative to the flexible plate 2, whereby the width of the guide slot 18 perpendicular to its longitudinal direction is approximately equal to the cross section of the connecting elements 12, which the latter have in the area where they pass through the flexible plate 2.

Still another feature of the invention resides broadly in the transmission device characterized by the fact that the guide slots 18 in the flexible plate 2 run in the circumferential direction of the flexible plate 2.

Yet another feature of the invention resides broadly in the transmission device characterized by the fact that the guide slots 18 run parallel to one another.

Still yet another feature of the invention resides broadly in the transmission device characterized by the fact that between the respective through hole 16 and the corresponding guide slot 18 there is a narrower neck 20.

Yet still another feature of the invention resides broadly in the transmission device characterized by the fact that the through holes 16 are provided with a collar 22 in the peripheral area.

Another feature of the invention resides broadly in the transmission device characterized by the fact that the collars 22 can be manufactured by raising at least one of the brackets 24 provided in the peripheral areas of the through holes 16.

Yet another feature of the invention resides broadly in the transmission device characterized by the fact that the collar 22 can be attached to the flexible plate 2 by means of an adhesive connection.

Still another feature of the invention resides broadly in the transmission device characterized by the fact that the collars 22 can be realized by a spraying, molding, pressing, forging, or stamping or injection molding on the flexible plate 2.

A further feature of the invention resides broadly in the transmission device characterized by the fact that the collars can be manufactured by incorporating spacers 25 in to the flexible plate 2.

Another feature of the invention resides broadly in the transmission device characterized by the fact that lugs 27 engaged in the through holes 16 are formed on the flywheel 3 on its side facing the flexible plate 2.

Yet another feature of the invention resides broadly in the transmission device characterized by the fact that the guide slots 18, on their ends facing the through holes 16, are each provided with a projection 28 facing the retaining part 13 of the corresponding connecting element 12.

Still another feature of the invention resides broadly in the transmission device characterized by the fact that the projection 28 is formed by material displacement initiated from the underside of the flexible plate 2.

A further feature of the invention resides broadly in the transmission device characterized by the fact that the projection 28 is formed by lifting at least one bracket 24 from the flexible plate 2 in the peripheral area of the guide slot 18.

Another feature of the invention resides broadly in the transmission device characterized by the fact that the projection 28 is molded onto the flexible plate 2.

Yet another feature of the invention resides broadly in the transmission device characterized by the fact that the projection 28 is connected to the flexible plate 2 by means of an adhesive connection.

Still another feature of the invention resides broadly in the transmission device characterized by the fact that the connecting elements 12 can be rotationally secured by means of an adhesive connection to the flexible plate 2.

A further feature of the invention resides broadly in the transmission device characterized by the fact that the flexible plate 2 can be held in contact with the retaining parts 13 of the connecting elements 12 by means of spring means 35 provided between the flexible plate 2 and the connecting elements 12.

Another feature of the invention resides broadly in the transmission device characterized by the fact that the spring means 35 are formed by spring plates 36.

Yet another feature of the invention resides broadly in the transmission device characterized by the fact that the spring plates 36 surround the corresponding connecting element 12.

Still another feature of the invention resides broadly in the transmission device characterized by the fact that there is a spring plate 36 surrounding the axis 70 of the flywheel 3.

A further feature of the invention resides broadly in the transmission device characterized by the fact that the spring means 35 are fixed in a recess 37 of the flywheel 3.

Another feature of the invention resides broadly in the transmission device characterized by the fact that the connecting elements 12 are formed by screws 40, each of which has a rectangular-shaped head 41, which can be oriented perpendicular to the longitudinal direction of a rectangular through hole 42, and with which, under the action of a spring means 35, at least one projection 28 running perpendicular to the through hole 42 and which is provided on the flexible plate 2 on the side facing the head 41 of the screw 40, can be brought into contact.

Yet another feature of the invention resides broadly in the transmission device characterized by the fact that the connecting elements 12 are formed by screws 40, on the head of each of which the retaining part 13 is realized.

Still another feature of the invention resides broadly in the transmission device characterized by the fact that as the connecting elements 12, there are stay bolts 33 fastened to the flywheel 3, each of which is provided with a nut 34 engaging the flexible plate 2 from behind.

Still another feature of the invention resides broadly in the flywheel, characterized by the fact that the thrust plate 6" has an outside diameter which is approximately equal to the maximum outside diameter $D_1$ of the friction lining 9" of the clutch disc 8", and there are recesses 13" which correspond approximately to the axial projection of the lugs 11" of the flywheel 1".

Yet another feature of the invention resides broadly in the flywheel, characterized by the fact that the radially inner generating curve of the envelope of the threads 12" for the threaded fasteners 5" runs essentially between the inside diameter of the concentric wall 10" of the flywheel 1" and the maximum outside diameter $D_1$ of the friction lining 9" of the clutch disc 8".

Still yet another feature of the invention resides broadly in the flywheel, characterized by the fact that in the concentric wall 10" in the flywheel 1", there are recesses 14" running essentially radially on the circumference between the lugs 11", into which radial projections 5" of the thrust plate 6" extend, which are connected by means of tangential leaf springs 16" to the clutch housing 4".

Yet still another feature of the invention resides broadly in the flywheel, characterized by the fact that it is designed as a secondary centrifugal mass of a flywheel with two centrifugal masses, whereby the primary centrifugal mass 17" is fastened directly to the crankshaft of the internal combustion engine, the secondary centrifugal mass flywheel 1" is fastened by means of a bearing 21" so that it is centered in relation to the primary centrifugal mass 17" and is mounted so that it can rotate, whereby a torsion damping device 19" is located between the two centrifugal masses, and in the area radially outside the secondary centrifugal mass flywheel 1"—at least approximately in the vicinity of the concentric wall 10", there is a supplemental centrifugal mass 23" of the primary centrifugal mass flywheel 1" extending essentially axially.

Types of transmissions in which the present invention may be incorporated may be disclosed in the following U.S. Patents: U.S. Pat. No. 5,199,316 to Hoffman on Apr. 6, 1993, entitled "Fully-synchronized Multiple Speed Manual Transmission for Motor Vehicles"; U.S. Pat. No. 4,458,551 to Winter on Jul. 10, 1984, entitled "Manual Transmission"; and U.S. Pat. No. 3,858,460 to Porter et al. on Jan. 1, 1975, entitled "Four Speed Manual Transmission and Control".

Types of clutch assemblies may be disclosed in the following U.S. Patents: U.S. Pat. No. 5,191,810 to Craft et al. on Mar. 9, 1993, entitled "Vehicle Modular Clutch Attaching Arrangement"; U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

Types of two-mass flywheels may be disclosed in the following U.S. Patents: U.S. Pat. No. 5,103,688 to Kuhne on Apr. 14, 1992, entitled "Two-mass Flywheel"; and U.S. Pat. No. 4,777,843 to Bopp on Oct. 18, 1988, entitled "Two-mass Flywheel Assembly with Viscous Damping Assembly".

Examples of assembly systems or automatic machines which may be used in accordance with the present invention may be disclosed in the following U.S. Patents: U.S. Pat. No. 5,186,037 to Bihler on Feb. 16, 1993, entitled "Processing Machine, Especially Automatic Punching and Bending Machine"; U.S. Pat. No. 5,246,322 to Salice on Sep. 21, 1993, entitled "Fastening Element Comprising a Dowel-shaped Sleeve"; U.S. Pat. No. 5,305,510 to Lokring Corporation on Apr. 26, 1994, entitled "Hydraulic Assembly Tool"; U.S. Pat. No. 4,894,908 to GMF Robotics Corporation on Jan. 23, 1990, entitled "Method for Automated Assembly"; U.S. Pat. No. 4,972,932 to Kaisha on Nov. 27, 1990, entitled "Spring Connected Armature Assembly"; and U.S. Pat. No. 5,221,884 to Teshima on Jun. 22, 1993, entitled "Numerical Control Apparatus".

Some types of industrial robots and assembly processes using such robots which could possibly be used in the assembly of the present invention may be disclosed in the following U.S. Patents: U.S. Pat. No. 5,197,846 to Uno et al., entitled "Six-Degree-of-Freedom Articulated Robot Mechanism and Assembling and Working Apparatus Using Same"; U.S. Pat. No. 5,267,385 to Ikeda et al., entitled "Automatic Assembly Apparatus"; U.S. Pat. No. 5,295,778 to Hirai et al., entitled "Assembling Apparatus"; U.S. Pat.

No. 5,319,845 to Watanabe, et al., entitled "Assembling Apparatus Using Robot"; and U.S. Pat. No. 5,253,911 to Storage Technology Corporation, entitled "Gripper Apparatus for Use in a Robotics System".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein are hereby incorporated by reference as if set forth in their entirety herein.

The corresponding foreign patent publication applications, namely, Federal Republic of Germany Patent Application No. P 44 06 291.5, filed on Feb. 26, 1994, having inventors Gerda Rudolph, Michael Grosse-Erdmann, Joseph L. Bair, Edwin Murray, Peter Doll, and Heiko Schulz-Andres, and DE-OS P 44 06 291.5 and P 44 06 291.5, as well as their published equivalents, are hereby incorporated by reference as if set forth in their entirety herein.

The corresponding foreign patent publication applications, namely, Federal Republic of Germany Patent Application No. P 43 11 102, filed on Apr. 3, 1993, having inventors Bernhard Schierling and Hilmar Göbel, and DE-OS P 43 11 102 and DE-PS P 43 11 102, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A transmission system for a motor vehicle, said transmission system comprising a manual transmission;

said manual transmission comprising:

a flywheel having a circumference and a longitudinal axis, said circumference of said flywheel being disposed concentrically about said longitudinal axis;

a clutch pressure plate being releasably engageable with said flywheel;

a clutch disc;

said clutch disc being disposed between said clutch pressure plate and said flywheel;

said clutch disc comprising:
friction lining means;
said friction lining means for contacting said clutch pressure plate and said flywheel;

said clutch pressure plate being axially movable and for causing said clutch disc to engage and disengage with said flywheel;

a clutch housing disposed adjacent said clutch pressure plate;

said flywheel having a disk-like portion extending from said longitudinal axis to said circumference;

said transmission system further comprising:

crankshaft means;

said crankshaft means having one end facing toward said flywheel and an end opposite said one end facing away from said flywheel;

a flexible automatic transmission drive plate;

said flexible automatic transmission drive plate having a thickness dimension;

said flexible automatic transmission drive plate being disposed between and in contact with said flywheel and said crankshaft means;

connecting means for connecting said flexible automatic transmission drive plate and engaging with said crankshaft means to fasten said flexible automatic transmission drive plate to said crankshaft means;

connecting elements for fastening said flexible automatic transmission drive plate to said flywheel;

said flexible automatic transmission drive plate being fastened by said connecting elements to said flywheel;

each said connecting element having a head and a shank connected to said head;

said shanks of said connecting elements being disposed at least partially in said flywheel;

said heads projecting and extending beyond the surface of said flywheel at a distance greater than the thickness of the flexible automatic transmission drive plate prior to complete assembly of said transmission system;

said flexible automatic transmission drive plate for being placed between said flywheel and said heads of said connecting elements;

said flexible automatic transmission drive plate comprising:
a plurality of aperture means disposed in said flexible automatic transmission drive plate;
said aperture means extending through said flexible automatic transmission drive plate;

each said aperture means comprising a first portion and a second portion;

said first portion being disposed and dimensioned to permit said heads of said connecting elements to pass through said aperture means;

said second portion being disposed and dimensioned to retain said connecting elements in said aperture means by permitting said heads of said connecting elements to be disposed against and to bear against said flexible automatic transmission drive plate during assembly of said transmission system;

said flywheel and said flexible automatic transmission drive plate being positioned for movement one relative to the other to permit movement of said heads of said connecting elements into said first portion during assembly of said transmission system;

the position of said heads in said flywheel having been positioned to have permitted relative movement between said heads of said connecting elements and said flexible automatic transmission drive plate from a first position with said heads in said first portion into a second position with said heads in said second portion during assembly of said transmission system;

said connecting elements having been disposed during assembly of said transmission system to permit said relative movement of said heads and said flexible automatic transmission drive plate to said second position to permit said heads to be disposed against and to bear against said flexible automatic transmission drive plate;

said crankshaft means being disposed in an engine;

said transmission system comprising said engine connected to said manual transmission by said flexible automatic transmission drive plate;

each second portion comprising a slot for guiding the shanks of the connecting elements and for maintaining said shanks in position within said slot;

said slots comprising a longitudinal dimension disposed to permit movement of said shanks of said connecting elements relative to said flexible drive plate from said first portion into said second portion;

said slots having widths;

said widths of said slots being approximately equal to the diameter of the shank of the connecting element in the area where the shank passes through the flexible drive plate;

said longitudinal dimensions of said slots running in one of two directions, a) and b), within the flexible plate; said direction a) extending in the circumferential direction of the flexible drive plate;

said direction b) extending such that the longitudinal dimensions of the slots being parallel to one another;

each said slot having a third portion between said first portion and said second portion;

said third portion comprising a transitional area between said first portion and said second portion;

said third portion having a width;

said width of said third portion being narrower than said second portion for resisting the shank of the connecting element during assembly of the transmission system to assure positive engagement of the connecting elements into their corresponding second portions;

said aperture means comprising a peripheral area;

a collar being disposed in said peripheral area of said aperture means;

said collar comprising at least one raised projection disposed in the peripheral area of said flexible drive plate;

each said projection being disposed adjacent said first portion and opposite said second portion of said aperture means;

each said projection having aligned an assembly tool to said head during manufacture thereby generally preventing the tightening of the connecting elements before the connecting elements are positioned in said second portion of their corresponding aperture means;

said projections having been manufactured to comprise one of A), B), C), and D) as follows:

A) comprising a bracket; B) comprising adhesion of a connection to said flexible drive plate; C) comprising one of forging, pressing, or stamping of said collar; and D) comprising a spacer;

said bracket of A) comprising a raised end on said flexible drive plate in the peripheral area of said aperture means such that the raised end of the bracket, which is unsupported, faces said aperture means;

B) comprising said connection being adhered by adhesive means to attach the collar onto the flexible drive plate in the peripheral area of said aperture means;

C) further comprising one of extruding, injecting, molding, forging, pressing and stamping the metal of said flexible drive plate during manufacture so as to cause a flow of the metal of said flexible drive plate and plastically deform said metal thereby forming the collar on the flexible drive plate in the peripheral area of said aperture means; and in D) said spacer comprising a rivet attached to and projecting from the flexible drive plate in the peripheral area of said aperture means.

2. The transmission system according to claim 1 including means for maintaining said connecting elements within said second portion;

said means for maintaining comprising one of items I.), II.), III.), IV.), V.), VI.), and VII.) as follows:

item I.) comprising a projection extending toward said plate from said flywheel;

said flywheel projection extending through at least a part of said aperture means during and subsequent to assembly;

II.) said connecting elements having means adjacent said shank for retaining said connecting elements within said second portion;

said flexible drive plate comprising a first part adjacent said second portion of said aperture means for making contact with said retaining means;

said first part for holding said connecting element within said second portion;

III.) said connecting elements having means adjacent said shank for retaining said connecting elements within said second portion;

said flexible drive plate comprising a second part adjacent said second portion of said aperture means for making contact with said retaining means;

said second part for holding said connecting element within said second portion;

said second part comprising a projection for retaining said connecting elements within said second portion of said aperture means;

said projection being formed by displacement of the material of the side of the flexible drive plate facing toward said flywheel;

IV.) said connecting elements having means adjacent said shank for retaining said connecting elements within said second portion;

said flexible drive plate comprising a third part adjacent said second portion of said aperture means for making contact with said retaining means;

said third part for holding said connecting element within said second portion;

said third part comprising a projection for retaining said connecting elements within said second portion of said aperture means;

said projection being formed by raising at least one bracket on the flexible drive plate such that the raised end of said bracket comes into contact with said connecting element;

V.) said connecting elements having means adjacent said shank for retaining said connecting elements within said second portion;

said flexible drive plate comprising a fourth part adjacent said second portion of said aperture means for making contact with said retaining means;

said fourth part for holding said connecting element within said second portion;

said fourth part comprising a projection for retaining said connecting elements within said second portion of said aperture means;

said flexible drive plate having a side adjacent said flywheel;

said projection having been formed by pressure onto the flexible drive plate from the side of said flexible drive plate to be adjacent said flywheel;

VI.) said connecting elements having means adjacent said shank for retaining said connecting elements within said second portion;

said flexible drive plate comprising a fifth part adjacent said second portion of said aperture means for making contact with said retaining means;

said fifth part for holding said connecting element within said second portion;

said fifth part comprising a projection for retaining said connecting elements within said second portion of said aperture means;

said projection being attached to said flexible drive plate by means of an adhesive connection; and VII.) means for adhesively connecting said connecting elements to the flexible drive plate to rotationally secure said connecting elements to said flexible drive plate.

3. The transmission system according to claim 2 including means for maintaining frictional contact between said connecting elements and said flexible drive plate during assembly;

said means for maintaining frictional contact comprising spring means;

said connecting elements having means adjacent said shank for retaining said connecting elements within said second portion;

said spring means for holding said flexible drive plate in frictional contact with said retaining means;

said spring means comprising one of i.), ii.), and iii.) as follows:

i.) a plurality of spring means;

each of said plurality of spring means being disposed to surround its corresponding connecting element;

ii.) said spring means are formed by a spring plate;

said spring plate being disposed to surround the axis of said flywheel;

iii.) said flywheel comprising a recess;

said spring plate being fixed in said recess on said flywheel.

4. The transmission system according to claim 3 wherein:

said connecting elements comprise one of items 1) and 2) as follows:

item 1) comprising a screw having a rectangular-shaped head;

the head of said screw of item 1) being dimensioned to permit passage of said rectangular-shaped head through said first portion of said aperture means;

said aperture means having a rectangular shape;

said rectangular aperture means having a longitudinal axis;

said first portion comprises aperture portions along the longitudinal axis and said second portion comprises aperture portions transverse to said longitudingal axis;

said rectangular-shaped head being oriented perpendicular to the longitudinal direction of said rectangular aperture means during assembly so as to engage said second portion of said aperture means;

said rectangular-shaped head being disposed to lie on both sides of said rectangular aperture means after assembly;

item 1) further comprising:

said spring means being disposed adjacent said flywheel;

said flexible drive plate comprising projection means;

said spring means of said flywheel and said projection means of said flexible drive plate coming in contact with said head of said screw;

said spring means and said projection means securing said rectangular-shaped head within the rectangular aperture means;

said rectangular-shaped head screw having a shank;

means adjacent said shank for retaining said screw within said aperture means;

item 2) comprising stay bolts;

said stay bolts being disposed within said flywheel by means of one of: riveting, screwing, casting, and blind riveting;

said stay bolt provided with a nut;

said nut engaging the flexible drive plate and fastening said flexible drive plate to the flywheel;

said stay bolt having a shank; and means adjacent said shank for retaining said stay bolt within its corresponding aperture means.

5. A method of manufacturing a transmission system for a motor vehicle, said transmission system comprising a manual transmission; the manual transmission comprising: a flywheel having a circumference and a longitudinal axis, the circumference of the flywheel being disposed concentrically about the longitudinal axis; a clutch pressure plate being releasably engageable with the flywheel; a clutch disc; the clutch disc being disposed between the clutch pressure plate and the flywheel; the clutch disc comprising: friction lining means; the friction lining means for contacting the clutch pressure plate and the flywheel; the clutch pressure plate being axially movable and for causing the clutch disc to engage and disengage with the flywheel; a clutch housing disposed adjacent the clutch pressure plate; the flywheel having a disk-like portion extending from the longitudinal axis to the circumference; the transmission system further comprising: crankshaft means; crankshaft means having one end facing toward the flywheel and an end opposite the one end facing away from the flywheel; a flexible transmission drive plate; the flexible transmission drive plate having a thickness dimension; the flexible transmission drive plate being disposed between and in contact with the flywheel and the crankshaft means; connecting means for connecting the flexible transmission drive plate and engaging with the crankshaft means to fasten the flexible transmission drive plate to said crankshaft means; connecting elements for fastening the flexible transmission drive plate to the flywheel; the flexible transmission drive plate being fastened by the connecting elements to the flywheel; each connecting element having a head and a shank connected to the head; the shanks of the connecting elements being disposed at least partially in the flywheel; the heads projecting and extending beyond the surface of the flywheel at a distance greater than the thickness of the flexible transmission drive plate prior to complete assembly of the transmission system; the flexible transmission drive plate for being placed between the flywheel and the heads of the connecting elements; the flexible transmission drive plate comprising: a plurality of aperture means disposed in the flexible transmission drive plate; the aperture means extending through the flexible transmission drive plate; each aperture means comprising a first portion and a second portion; the first portion being disposed and dimensioned to permit the heads of the connecting elements to pass through the aperture means; the second portion being disposed and dimensioned to retain the connecting elements in the aperture means by permitting the heads of the connecting elements to be tightened against and to bear against the second portion during assembly of the transmission system; the flywheel and the flexible transmission drive plate being positioned for movement one relative to the other to permit movement of the heads of the connecting elements into the first portion during assembly of the transmission system; the position of the heads in the flywheel having been positioned to have permitted movement of the heads of the connecting elements relative to the flexible transmission drive plate from the first portion into the second portion during assembly of the transmission system; the connecting elements having been disposed during assembly of the transmission system to permit the movement of the heads to the second portion and to permit the heads to be tightened against and to bear against the second portion; the crankshaft means being disposed in an engine; and the transmission system comprising the engine connected to the manual transmission by the flexible transmission drive plate;

said method comprising the steps of:
  providing a flywheel having a circumference and a longitudinal axis, the circumference of the flywheel being disposed concentrically about the longitudinal axis, the flywheel having a disk-like portion extending from the longitudinal axis to the circumference;
  providing a clutch pressure plate for being releasably engageable with the flywheel;
  providing a clutch disc;
  providing friction lining means for contacting the clutch pressure plate and the flywheel;
  the clutch pressure plate for being axially movable, the clutch pressure plate for causing the clutch disc to engage and disengage with the flywheel;
  providing a clutch housing;
  providing crankshaft means having a first end and a second end;
  the first end of the crankshaft means for being adjacent the flywheel and the second end of the crankshaft means for facing away from the flywheel;
  providing a flexible transmission drive plate;
  the flexible transmission drive plate having a thickness dimension;
  providing connecting means;
  the connecting means being for connecting the flexible transmission drive plate and engaging with the crankshaft means for fastening the flexible transmission drive plate to the crankshaft means;
  providing connecting elements;
  the connecting elements for fastening the flexible transmission drive plate to the flywheel;
  each connecting element having a head and a shank connected to the head;
  the flexible transmission drive plate for being placed between the flywheel and the heads of the connecting elements;
  providing the flexible transmission drive plate with a plurality of aperture means;
  the aperture means extending through the flexible transmission drive plate;
  each of the aperture means comprising a first portion and a second portion;
  the first portion to permit the heads of the connecting elements to pass through the aperture means;
  the second portion to retain the connecting elements in the aperture means by permitting the heads of the connecting elements to be tightened against and to bear against the second portion during assembly of the transmission system;
said crankshaft means being disposed in an engine;
said method comprising the steps of:
  disposing the clutch disc between the clutch pressure plate and the flywheel;
  disposing the friction lining means in a position to contact the clutch pressure plate and the flywheel;
  disposing the clutch pressure plate to be axially movable, disposing the clutch pressure plate for causing the clutch disc to engage and disengage with the flywheel;
  disposing the clutch housing adjacent the clutch pressure plate;
  disposing the first end of the crankshaft means adjacent the flywheel and disposing the second end of the crankshaft means away from the flywheel;
  disposing the flexible transmission drive plate between and in contact with the flywheel and the crankshaft means;
  connecting the connecting means to engage with the crankshaft means and to fasten the flexible transmission drive plate to the crankshaft means;
  disposing the shanks of the connecting elements at least partially in the flywheel;
  disposing the heads to project and extend beyond the surface of the flywheel at a distance greater than the thickness of the flexible transmission drive plate prior to complete assembly of the transmission system;
  disposing the flexible transmission drive plate adjacent the flywheel and the heads of the connecting elements;
  positioning the heads in the flywheel to permit movement of the heads of the connecting elements relative to the flexible transmission drive plate from the first portion into the second portion;
  positioning the flywheel and the flexible transmission drive plate to be moved one relative to the other to permit movement of the heads of the connecting elements into the first portion;
  moving the heads of the connecting elements into the first portion;
  moving the heads of the connecting elements relative to the flexible transmission drive plate from the first portion into the second portion;
  tightening the heads against the second portion of the aperture means so that the heads bear against the second portion of the aperture means; and
  disposing the crankshaft means in an engine whereby a manual transmission-engine unit is produced;
said aperture means comprising a peripheral area;
a collar being disposed in said peripheral area of said aperture means;
said collar comprising at least one raised projection disposed in the peripheral area of said flexible drive plate;
each said projection being disposed adjacent said first portion and opposite said second portion of said aperture means;
each said projection having aligned an assembly tool to the head during manufacture thereby generally preventing the tightening of the connecting elements before the connecting elements are positioned in said second portion of their corresponding aperture means;
said projections having been manufactured to comprise one of A), B), C), and D) as follows:
A) comprising a bracket; B) comprising adhesion of a connection to said flexible drive plate; C) comprising one of forging, pressing, and stamping of said collar; and D) comprising a spacer;
said bracket of A) comprising a raised end on said flexible drive plate in the peripheral area of said aperture means such that the raised end of the bracket, which is unsupported, faces said aperture means;

B) comprising said connection being adhered by adhesive means to attach the collar onto the flexible drive plate in the peripheral area of said aperture means;

C) further comprising one of extruding, injecting, molding, forging, pressing and stamping the metal of said flexible drive plate during manufacture so as to cause a flow of the metal of said flexible drive plate and plastically deform said metal thereby forming the collar on the flexible drive plate in the peripheral area of said aperture means;

in D) said spacer comprising a rivet attached to and projecting from the flexible drive plate in the peripheral area of said aperture means.

6. The method according to claim 5 wherein:

each second portion comprises a slot for guiding the shanks of the connecting elements and for maintaining said shanks in position within said slot;

said slots comprising a longitudinal dimension disposed to permit movement of said shanks of said connecting elements relative to said flexible drive plate from said first portion into said second portion;

said slots having widths;

said widths of said slots being approximately equal to the diameter of the shank of the connecting element in the area where the shank passes through the flexible drive plate;

said longitudinal dimensions of said slots running in one of two directions, a) and b), within the flexible plate;
    said direction a) extending in the circumferential direction of the flexible drive plate;
    said direction b) extending such that the longitudinal dimensions of the slots are parallel to one another; and moving said shanks along one of directions a) and b) during assembly.

7. The method according to claim 6 wherein:

each said slot has a third portion between said first portion and said second portion;

said third portion comprises a transitional area between said first portion and said second portion;

said third portion has a width;

said width of said third portion being narrower than said second portion for resisting the shank of the connecting element during assembly of the transmission system to assure positive engagement of the connecting elements into their corresponding second portions; and moving said shanks to make contact with said third portion during assembly.

8. The method according to claim 7 including:

means for maintaining said connecting elements within said second portion;

said means for maintaining comprising one of items I.), II.), III.), IV.), V.), VI.), and VII.) as follows:

item I.) comprising a projection extending toward said plate from said flywheel;

said flywheel projection extending through at least a part of said aperture means during and subsequent to assembly;

II.) said connecting elements having means adjacent said shank for retaining said connecting elements within said second portion;

said flexible drive plate comprising a first part adjacent said second portion of said aperture means for making contact with said retaining means;

said first part for holding said connecting element within said second portion;

III.) said connecting elements having means adjacent said shank for retaining said connecting elements within said second portion;

said flexible drive plate comprising a second part adjacent said second portion of said aperture means for making contact with said retaining means;

said second part for holding said connecting element within said second portion;

said second part comprising a projection for retaining said connecting elements within said second portion of said aperture means;

said projection being formed by displacement of the material of the side of the flexible drive plate facing toward said flywheel;

IV.) said connecting elements having means adjacent said shank for retaining said connecting elements within said second portion;

said flexible drive plate comprising a third part adjacent said second portion of said aperture means for making contact with said retaining means;

said third part for holding said connecting element within said second portion;

said third part comprising a projection for retaining said connecting elements within said second portion of said aperture means;

said projection being formed by raising at least one bracket on the flexible drive plate such that the raised end of said bracket comes into contact with said connecting element;

V.) said connecting elements having means adjacent said shank for retaining said connecting elements within said second portion;

said flexible drive plate comprising a fourth part adjacent said second portion of said aperture means for making contact with said retaining means;

said fourth part for holding said connecting element within said second portion;

said fourth part comprising a projection for retaining said connecting elements within said second portion of said aperture means;

said flexible drive plate having a side adjacent said flywheel;

said projection having been formed by pressure onto the flexible drive plate from the side of said flexible drive plate to be adjacent said flywheel;

VI.) said connecting elements having means adjacent said shank for retaining said connecting elements within said second portion;

said flexible drive plate comprising a fifth part adjacent said second portion of said aperture means for making contact with said retaining means;

said fifth part for holding said connecting element within said second portion;

said fifth part comprising a projection for retaining said connecting elements within said second portion of said aperture means;

said projection being attached to said flexible drive plate by means of an adhesive connection; and VII.) means for adhesively connecting said connecting elements to the flexible drive plate to rotationally secure said connecting elements to said flexible drive plate.

9. The method according to claim 8 including
means for maintaining frictional contact between said connecting elements and said flexible drive plate during assembly;
said means for maintaining frictional contact comprising spring means;
said connecting elements having means adjacent said shank for retaining said connecting elements within said second portion;
said spring means for holding said flexible drive plate in frictional contact with said retaining means;
said spring means comprising one of i.), ii.), and iii.) as follows:
i.) a plurality of spring means;
each of said plurality of spring means being disposed to surround its corresponding connecting element;
ii.) said spring means are formed by a spring plate;
said spring plate being disposed to surround the axis of said flywheel;
iii.) said flywheel comprising a recess;
said spring plate being fixed in said recess on said flywheel;
said connecting elements comprise one of items 1) and 2) as follows:
item 1) comprising a screw having a rectangular-shaped head;
the head of said screw of item 1) being dimensioned to permit passage of said rectangular-shaped head through said first portion of said aperture means;
said aperture means having a rectangular shape;
said rectangular aperture means having a longitudinal axis;
said rectangular-shaped head being oriented perpendicular to the longitudinal direction of said rectangular aperture means during assembly so as to engage said second portion of said aperture means;
said rectangular-shaped head being disposed to lie on both sides of said rectangular aperture means after assembly;
item 1) further comprising:
said spring means being disposed adjacent said flywheel;
said flexible drive plate comprising projection means;
said spring means of said flywheel and said projection means of said flexible drive plate coming in contact with said head of said screw;
said spring means and said projection means securing said rectangular-shaped head within the rectangular aperture means;
said rectangular-shaped head screw having a shank;
means adjacent said shank for retaining said screw within said aperture means;
item 2) comprising stay bolts;
said stay bolts being disposed within said flywheel by means of one of: riveting, screwing, casting, and blind riveting;
said stay bolt being provided with a nut;
said nut engaging the flexible drive plate and fastening said flexible drive plate to the flywheel;
said stay bolt having a shank; and
means adjacent said shank for retaining said stay bolt within its corresponding aperture means.

10. A transmission system for a motor vehicle, said transmission system comprising a manual transmission;
said manual transmission comprising:
a flywheel having a circumference and a longitudinal axis, said circumference of said flywheel being disposed concentrically about said longitudinal axis;
a clutch pressure plate being releasably engageable with said flywheel;
a clutch disc;
said clutch disc being disposed between said clutch pressure plate and said flywheel;
said clutch disc comprising:
friction lining means;
said friction lining means for contacting said clutch pressure plate and said flywheel;
said clutch pressure plate being axially movable and for causing said clutch disc to engage and disengage with said flywheel;
a clutch housing disposed adjacent said clutch pressure plate;
said flywheel having a disk-like portion extending from said longitudinal axis to said circumference;
said transmission system further comprising:
crankshaft means;
said crankshaft means having one end facing toward said flywheel and an end opposite said one end facing away from said flywheel;
a flexible automatic transmission drive plate;
said flexible automatic transmission drive plate having a thickness dimension;
said flexible automatic transmission drive plate being disposed between and in contact with said flywheel and said crankshaft means;
connecting means for connecting said flexible automatic transmission drive plate and engaging with said crankshaft means to fasten said flexible automatic transmission drive plate to said crankshaft means;
connecting elements for fastening said flexible automatic transmission drive plate to said flywheel;
said flexible automatic transmission drive plate being fastened by said connecting elements to said flywheel;
each said connecting element having a head and a shank connected to said head;
said shanks of said connecting elements being disposed at least partially in said flywheel;
said heads projecting and extending beyond the surface of said flywheel at a distance greater than the thickness of the flexible automatic transmission drive plate prior to complete assembly of said transmission system;
said flexible automatic transmission drive plate for being placed between said flywheel and said heads of said connecting elements;
said flexible automatic transmission drive plate comprising:
a plurality of aperture means disposed in said flexible automatic transmission drive plate;
said aperture means extending through said flexible automatic transmission drive plate;
each said aperture means comprising a first portion and a second portion;
said first portion being disposed and dimensioned to permit said heads of said connecting elements to pass through said aperture means;
said second portion being disposed and dimensioned to retain said connecting elements in said aperture means by permitting said heads of said connecting elements to be disposed against and to bear against said flexible automatic transmission drive plate during assembly of said transmission system;

said flywheel and said flexible automatic transmission drive plate being positioned for movement one relative to the other to permit movement of said heads of said connecting elements into said first portion during assembly of said transmission system;

the position of said heads in said flywheel having been positioned to have permitted relative movement between said heads of said connecting elements and said flexible automatic transmission drive plate from a first position with said heads in said first portion into a second position with said heads in said second portion during assembly of said transmission system;

said connecting elements having been disposed during assembly of said transmission system to permit said relative movement of said heads and said flexible automatic transmission drive plate to said second position to permit said heads to be disposed against and to bear against said flexible automatic transmission drive plate;

said crankshaft means being disposed in an engine;

said transmission system comprising said engine connected to said manual transmission by said flexible automatic transmission drive plate;

said aperture means comprising a peripheral area;

a collar being disposed in said peripheral area of said aperture means;

said collar comprising at least one raised projection disposed in the peripheral area of said flexible drive plate;

each said projection being disposed adjacent said first portion and opposite said second portion of said aperture means;

each said projection having aligned an assembly tool to said head during manufacture thereby generally preventing the tightening of the connecting elements before the connecting elements are positioned in said second portion of their corresponding aperture means;

said projections having been manufactured to comprise one of A), B), C), and D) as follows:

A) comprising a bracket; B) comprising adhesion of a connection to said flexible drive plate; C) comprising one of forging, pressing, or stamping of said collar; and D) comprising a spacer;

said bracket of A) comprising a raised end on said flexible drive plate in the peripheral area of said aperture means such that the raised end of the bracket, which is unsupported, faces said aperture means;

B) comprising said connection being adhered by adhesive means to attach the collar onto the flexible drive plate in the peripheral area of said aperture means;

C) further comprising one of extruding, injecting, molding, forging, pressing and stamping the metal of said flexible drive plate during manufacture so as to cause a flow of the metal of said flexible drive plate and plastically deform said metal thereby forming the collar on the flexible drive plate in the peripheral area of said aperture means; and in D) said spacer comprising a rivet attached to and projecting from the flexible drive plate in the peripheral area of said aperture means.

11. A transmission system for a motor vehicle, said transmission system comprising a manual transmission;

said manual transmission comprising:

a flywheel having a circumference and a longitudinal axis, said circumference of said flywheel being disposed concentrically about said longitudinal axis;

a clutch pressure plate being releasably engageable with said flywheel;

a clutch disc;

said clutch disc being disposed between said clutch pressure plate and said flywheel;

said clutch disc comprising:
friction lining means;
said friction lining means for contacting said clutch pressure plate and said flywheel;

said clutch pressure plate being axially movable and for causing said clutch disc to engage and disengage with said flywheel;

a clutch housing disposed adjacent said clutch pressure plate;

said flywheel having a disk-like portion extending from said longitudinal axis to said circumference;

said transmission system further comprising:
crankshaft means;

said crankshaft means having one end facing toward said flywheel and an end opposite said one end facing away from said flywheel;

a flexible automatic transmission drive plate;

said flexible automatic transmission drive plate having a thickness dimension;

said flexible automatic transmission drive plate being disposed between and in contact with said flywheel and said crankshaft means;

connecting means for connecting said flexible automatic transmission drive plate and engaging with said crankshaft means to fasten said flexible automatic transmission drive plate to said crankshaft means;

connecting elements for fastening said flexible automatic transmission drive plate to said flywheel;

said flexible automatic transmission drive plate being fastened by said connecting elements to said flywheel;

each said connecting element having a head and a shank connected to said head;

said shanks of said connecting elements being disposed at least partially in said flywheel;

said heads projecting and extending beyond the surface of said flywheel at a distance greater than the thickness of the flexible automatic transmission drive plate prior to complete assembly of said transmission system;

said flexible automatic transmission drive plate for being placed between said flywheel and said heads of said connecting elements;

said flexible automatic transmission drive plate comprising:
a plurality of aperture means disposed in said flexible automatic transmission drive plate;
said aperture means extending through said flexible automatic transmission drive plate;

each said aperture means comprising a first portion and a second portion;

said first portion being disposed and dimensioned to permit said heads of said connecting elements to pass through said aperture means;

said second portion being disposed and dimensioned to retain said connecting elements in said aperture means by permitting said heads of said connecting elements to be disposed against and to bear against said flexible automatic transmission drive plate during assembly of said transmission system;

said flywheel and said flexible automatic transmission drive plate being positioned for movement one relative to the other to permit movement of said heads of said connecting elements into said first portion during assembly of said transmission system;

the position of said heads in said flywheel having been positioned to have permitted relative movement between said heads of said connecting elements and said flexible automatic transmission drive plate from a first position with said heads in said first portion into a second position with said heads in said second portion during assembly of said transmission system;

said connecting elements having been disposed during assembly of said transmission system to permit said relative movement of said heads and said flexible automatic transmission drive plate to said second position to permit said heads to be disposed against and to bear against said flexible automatic transmission drive plate;

said crankshaft means being disposed in an engine;

said transmission system comprising said engine connected to said manual transmission by said flexible automatic transmission drive plate;

means for maintaining said connecting elements within said second portion;

said means for maintaining comprising a projection extending toward said plate from said flywheel; and said flywheel projection extending through at least a part of said aperture means during and subsequent to assembly.

12. A transmission system for a motor vehicle, said transmission system comprising a manual transmission;

said manual transmission comprising:

a flywheel having a circumference and a longitudinal axis, said circumference of said flywheel being disposed concentrically about said longitudinal axis;

a clutch pressure plate being releasably engageable with said flywheel;

a clutch disc;

said clutch disc being disposed between said clutch pressure plate and said flywheel;

said clutch disc comprising:
friction lining means;
said friction lining means for contacting said clutch pressure plate and said flywheel;

said clutch pressure plate being axially movable and for causing said clutch disc to engage and disengage with said flywheel;

a clutch housing disposed adjacent said clutch pressure plate;

said flywheel having a disk-like portion extending from said longitudinal axis to said circumference;

said transmission system further comprising:
crankshaft means;
said crankshaft means having one end facing toward said flywheel and an end opposite said one end facing away from said flywheel;

a flexible automatic transmission drive plate;

said flexible automatic transmission drive plate having a thickness dimension;

said flexible automatic transmission drive plate being disposed between and in contact with said flywheel and said crankshaft means;

connecting means for connecting said flexible automatic transmission drive plate and engaging with said crankshaft means to fasten said flexible automatic transmission drive plate to said crankshaft means;

connecting elements for fastening said flexible automatic transmission drive plate to said flywheel;

said flexible automatic transmission drive plate being fastened by said connecting elements to said flywheel;

each said connecting element having a head and a shank connected to said head;

said shanks of said connecting elements being disposed at least partially in said flywheel;

said heads projecting and extending beyond the surface of said flywheel at a distance greater than the thickness of the flexible automatic transmission drive plate prior to complete assembly of said transmission system;

said flexible automatic transmission drive plate for being placed between said flywheel and said heads of said connecting elements;

said flexible automatic transmission drive plate comprising:
a plurality of aperture means disposed in said flexible automatic transmission drive plate;
said aperture means extending through said flexible automatic transmission drive plate;

each said aperture means comprising a first portion and a second portion;

said first portion being disposed and dimensioned to permit said heads of said connecting elements to pass through said aperture means;

said second portion being disposed and dimensioned to retain said connecting elements in said aperture means by permitting said heads of said connecting elements to be disposed against and to bear against said flexible automatic transmission drive plate during assembly of said transmission system;

said flywheel and said flexible automatic transmission drive plate being positioned for movement one relative to the other to permit movement of said heads of said connecting elements into said first portion during assembly of said transmission system;

the position of said heads in said flywheel having been positioned to have permitted relative movement between said heads of said connecting elements and said flexible automatic transmission drive plate from a first position with said heads in said first portion into a second position with said heads in said second portion during assembly of said transmission system;

said connecting elements having been disposed during assembly of said transmission system to permit said relative movement of said heads and said flexible automatic transmission drive plate to said second position to permit said heads to be disposed against and to bear against said flexible automatic transmission drive plate;

said crankshaft means being disposed in an engine;

said transmission system comprising said engine connected to said manual transmission by said flexible automatic transmission drive plate;

means for maintaining said connecting elements within said second portion;

said means for maintaining comprising said connecting elements having means adjacent said shank for retaining said connecting elements within said second portion;

said flexible drive plate comprising a part adjacent said second portion of said aperture means for making contact with said retaining means; and said part of said flexible drive plate for holding said connecting element within said second portion.

13. The transmission system according to claim 12 wherein:

said part of said flexible drive plate comprises a projection for retaining said connecting elements within said second portion of said aperture means; and said projection being formed by displacement of the material of the side of the flexible drive plate facing toward said flywheel.

14. The transmission system according to claim 12 wherein:

said part of said flexible drive plate comprises a projection for retaining said connecting elements within said second portion of said aperture means; and said projection being formed by raising at least one bracket on the flexible drive plate such that the raised end of said bracket comes into contact with said connecting element.

15. The transmission system according to claim 12 wherein:

said part of said flexible drive plate comprises a projection for retaining said connecting elements within said second portion of said aperture means;

said flexible drive plate having a side adjacent said flywheel; and said projection being formed by applying pressure onto the flexible drive plate from the side of said flexible drive plate to be adjacent said flywheel.

16. The transmission system according to claim 12 wherein:

said part of said flexible drive plate comprises a projection for retaining said connecting elements within said second portion of said aperture means; and said projection being attached to said flexible drive plate by means of an adhesive connection.

17. A transmission system for a motor vehicle, said transmission system comprising a manual transmission;

said manual transmission comprising:

a flywheel having a circumference and a longitudinal axis, said circumference of said flywheel being disposed concentrically about said longitudinal axis;

a clutch pressure plate being releasably engageable with said flywheel;

a clutch disc;

said clutch disc being disposed between said clutch pressure plate and said flywheel;

said clutch disc comprising:

friction lining means;

said friction lining means for contacting said clutch pressure plate and said flywheel;

said clutch pressure plate being axially movable and for causing said clutch disc to engage and disengage with said flywheel;

a clutch housing disposed adjacent said clutch pressure plate;

said flywheel having a disk-like portion extending from said longitudinal axis to said circumference;

said transmission system further comprising:

crankshaft means;

said crankshaft means having one end facing toward said flywheel and an end opposite said one end facing away from said flywheel;

a flexible automatic transmission drive plate;

said flexible automatic transmission drive plate having a thickness dimension;

said flexible automatic transmission drive plate being disposed between and in contact with said flywheel and said crankshaft means;

connecting means for connecting said flexible automatic transmission drive plate and engaging with said crankshaft means to fasten said flexible automatic transmission drive plate to said crankshaft means;

connecting elements for fastening said flexible automatic transmission drive plate to said flywheel;

said flexible automatic transmission drive plate being fastened by said connecting elements to said flywheel;

each said connecting element having a head and a shank connected to said head;

said shanks of said connecting elements being disposed at least partially in said flywheel;

said heads projecting and extending beyond the surface of said flywheel at a distance greater than the thickness of the flexible automatic transmission drive plate prior to complete assembly of said transmission system;

said flexible automatic transmission drive plate for being placed between said flywheel and said heads of said connecting elements;

said flexible automatic transmission drive plate comprising:

a plurality of aperture means disposed in said flexible automatic transmission drive plate;

said aperture means extending through said flexible automatic transmission drive plate;

each said aperture means comprising a first portion and a second portion;

said first portion being disposed and dimensioned to permit said heads of said connecting elements to pass through said aperture means;

said second portion being disposed and dimensioned to retain said connecting elements in said aperture means by permitting said heads of said connecting elements to be disposed against and to bear against said flexible automatic transmission drive plate during assembly of said transmission system;

said flywheel and said flexible automatic transmission drive plate being positioned for movement one relative to the other to permit movement of said heads of said connecting elements into said first portion during assembly of said transmission system;

the position of said heads in said flywheel having been positioned to have permitted relative movement between said heads of said connecting elements and said flexible automatic transmission drive plate from a first position with said heads in said first portion into a second position with said heads in said second portion during assembly of said transmission system;

said connecting elements having been disposed during assembly of said transmission system to permit said relative movement of said heads and said flexible automatic transmission drive plate to said second position to permit said heads to be disposed against and to bear against said flexible automatic transmission drive plate;

said crankshaft means being disposed in an engine;

said transmission system comprising said engine connected to said manual transmission by said flexible automatic transmission drive plate;

means for maintaining said connecting elements within said second portion; and said means for maintaining comprises means for adhesively connecting said connecting elements to the flexible drive plate to rotationally secure said connecting elements to said flexible drive plate.

* * * * *